United States Patent
Siemens et al.

(10) Patent No.: US 7,283,566 B2
(45) Date of Patent: Oct. 16, 2007

(54) METHOD AND CIRCUIT FOR GENERATING TIME STAMP DATA FROM AN EMBEDDED-CLOCK AUDIO DATA STREAM AND A VIDEO CLOCK

(75) Inventors: Duane Siemens, Mountain View, CA (US); William Sheet, Fremont, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 1166 days.

(21) Appl. No.: 10/357,750

(22) Filed: Feb. 4, 2003

(65) Prior Publication Data

US 2004/0080671 A1  Apr. 29, 2004

Related U.S. Application Data

(63) Continuation-in-part of application No. 10/171,860, filed on Jun. 14, 2002, now Pat. No. 7,088,398.

(51) Int. Cl.
*H04H 1/04* (2006.01)
*H04J 1/00* (2006.01)

(52) U.S. Cl. ............. 370/486; 370/493; 370/498; 348/423.1; 348/473

(58) Field of Classification Search ............ None
See application file for complete search history.

(56) References Cited

U.S. PATENT DOCUMENTS

| | | | |
|---|---|---|---|
| 5,150,211 A | 9/1992 | Charbonnel et al. | 358/143 |
| 5,199,030 A | 3/1993 | Ueda | 370/68 |
| 5,381,181 A * | 1/1995 | Deiss | 348/423.1 |
| 5,430,485 A * | 7/1995 | Lankford et al. | 348/423.1 |
| 5,467,137 A * | 11/1995 | Zdepski | 375/240.29 |
| 5,467,139 A * | 11/1995 | Lankford | 348/512 |
| 5,486,864 A * | 1/1996 | Zdepski | 348/423.1 |

(Continued)

FOREIGN PATENT DOCUMENTS

WO  WO 00/16525  3/2000

OTHER PUBLICATIONS

*High-Bandwidth Digital Content Protection System*, Revision 1.0, by Intel Corporation, Feb. 17, 2000, pp. 1-60.

(Continued)

*Primary Examiner*—Chirag G. Shah
(74) *Attorney, Agent, or Firm*—Girard & Equitz LLP

(57) ABSTRACT

In preferred embodiments, a system including a transmitter, a receiver, and a serial link, in which the transmitter is configured to transmit video data, embedded-clock auxiliary data (or auxiliary data derived from embedded-clock auxiliary data), and a video clock over the link to the receiver. The transmitter is configured to extract a sample clock from the auxiliary data without use of a phase-locked loop, and to generate time stamp data in response to the sample clock and the video clock. Typically, the auxiliary data are SPDIF (or other) audio data, and the sample clock changes state in response to codes that occur periodically in the audio data. Other aspects of the invention are a transmitter for use in such a system, a time stamp data generation circuit for use in such a transmitter, and a method for generating time stamp data in response to a stream of embedded-clock auxiliary data and a video clock.

63 Claims, 7 Drawing Sheets

U.S. PATENT DOCUMENTS

| | | | |
|---|---|---|---|
| 5,506,932 A | 4/1996 | Holmes et al. | 395/2.14 |
| 5,523,795 A | 6/1996 | Ueda | 348/480 |
| 5,541,662 A | 7/1996 | Adams et al. | 348/460 |
| 5,565,923 A * | 10/1996 | Zdepski | 375/240.26 |
| 5,905,769 A | 5/1999 | Lee et al. | 375/376 |
| 5,940,070 A | 8/1999 | Koo | 345/302 |
| 5,966,387 A | 10/1999 | Cloutier | 370/516 |
| 5,974,464 A | 10/1999 | Shin et al. | 709/231 |
| 6,101,195 A | 8/2000 | Lyons et al. | 370/498 |
| 6,141,691 A * | 10/2000 | Frink et al. | 709/233 |
| 6,157,674 A | 12/2000 | Oda et al. | 375/240 |
| 6,191,822 B1 | 2/2001 | Smyers | 348/552 |
| 6,208,665 B1 | 3/2001 | Loukianov et al. | 370/486 |
| 6,208,715 B1 | 3/2001 | Haavisto | 379/88.07 |
| 6,212,201 B1 | 4/2001 | Hinderks et al. | 370/468 |
| 6,249,669 B1 | 6/2001 | Ogino et al. | 455/63 |
| 6,583,821 B1 * | 6/2003 | Durand | 348/515 |
| 6,710,951 B1 * | 3/2004 | Cloke | 360/29 |
| 6,914,637 B1 * | 7/2005 | Wolf et al. | 348/473 |
| 2001/0044713 A1 | 11/2001 | Lokhoff et al. | |
| 2002/0163598 A1 | 11/2002 | Pasqualino | |
| 2003/0037342 A1 | 2/2003 | Pasqualino | |
| 2003/0076183 A1 * | 4/2003 | Tam et al. | 331/100 |
| 2003/0133509 A1 | 7/2003 | Yanagihara et al. | |
| 2006/0069810 A1 * | 3/2006 | Levy et al. | 709/248 |

OTHER PUBLICATIONS

*High-Bandwith Digital Content Protection System Revision 1.0 Erratum*, by Intel Corporation, Mar. 19, 2001, pp. 1-9.

*Upstream Link for High-bandwidth Digital Content Protection*, Revision 1.00, by Intel Corporation, Jan. 26, 2001, pp. 1-38.

Lieberman, David "PC Video Interface Looks to Add Audio Capability", *EE Times* (Mar. 26, 2001, 11:57 a.m. EST), pp. 1-3, downloaded from the Internet on May 23, 2001 from http://www.eetimes.com/story/OEG20010326S0029.

Silicon Image, Inc., "*Silicon Image First to Couple Digital Audio and Video on the DVI Link*", Sunnyvale, Jan. 16, 2001, pp. 1-4, downloaded from the Internet on May 22, 2001 from http://www.siimage.com/press/01_16_01.asp.

Silicon Image, Inc., "*CE Industry Heavyweights Proclaim DVI HDCP as the Interface for HDTV-Further Propelling Silicon Image into the CE Space*", Las Vegas, Jan. 4, 2001, pp. 1-4, downloaded from the Internet on May 22, 2001 from http://www.siimage.com/press/01_04_01a.asp.

HDMI Licensing, LLC, "*HDMI Download 1.0 Spec Adopter Agreement*", p. 1, downloaded from the Internet on Dec. 24, 2002 from http://www/hdmi.com/download/download.asp.

HDMI Licensing, LLC, "*HDMI Founders Hitachi, Matsushita (Panasonic), Philips, Silicon Image, Sony, Thomson and Toshiba Release Final HDMI 1.0 Specification Admid Broad Industry Support*", pp. 1-2, downloaded from the Internet on Dec. 24, 2002 from http://www/hdmi.com/press/release_120909.asp.

\* cited by examiner

METHOD AND CIRCUIT FOR GENERATING TIME STAMP DATA FROM AN EMBEDDED-CLOCK AUDIO DATA STREAM AND A VIDEO CLOCK

CROSS-REFERENCE TO RELATED APPLICATION

This application is a continuation-in-part of pending U.S. patent application Ser. No. 10/171,860, filed on Jun. 14, 2002 now U.S. Pat. No. 7,088,398, and assigned to the assignee of the present application.

TECHNICAL FIELD OF THE INVENTION

The invention pertains to methods and circuitry for generating time stamp data (indicative of cycle time stamps) for transmission over a link with auxiliary data (e.g., audio data) and a video clock to allow a receiver to generate an auxiliary data clock (for the auxiliary data) in response to the time stamps and video clock. In a class of embodiments, the invention is a time stamp data generation method and circuit configured to determine the number of video clock cycles in a defined audio period from an input SPDIF audio stream (or other embedded-clock audio stream) and a video clock.

BACKGROUND OF THE INVENTION

Throughout the specification, including in the claims, the expression "auxiliary data" is used in a broad sense to denote digital audio data or any other data that is neither video data nor timing information for video data (e.g., a video clock). For example, timing information for audio data (e.g., a clock for recovering transmitted audio data) falls within the scope of "auxiliary data." Other examples of "auxiliary data" transmitted in accordance with the invention include computer keyboard signals, still image data (generated by a camera, for example), text data, control signals for a power supply, picture in picture data, monitor control information (audio volume, brightness, power state), control signals for indicator lights on a monitor or keyboard, non-audio or video control information, etc.

Throughout the specification, including in the claims, the expression "audio data" denotes not only digital audio data samples but also data included (with digital audio data samples) in audio data packets. For example, a 32-bit packet ("sub-frame") of SPDIF audio data includes a 20-bit sample of audio data and twelve additional bits (including a 4-bit "B," "M," or "W" preamble), and all 32 such bits are "audio data" bits as defined herein.

The term "stream" of data, as used herein, denotes that all the data are of the same type and is transmitted with the same clock frequency. The term "channel," as used herein, refers to that portion of a serial link that is employed to transmit data (e.g., a particular conductor or conductor pair between a transmitter and receiver over which the data are transmitted, and specific circuitry within the transmitter and/or receiver used for transmitting and/or recovery of the data) and to the technique employed to transmit the data over the link. A channel can be employed to transmit one stream of data, or more than one stream of data.

The term "transmitter" is used herein in a broad sense to denote any device capable of encoding data and transmitting the encoded data over a serial link (and optionally also performing additional functions, which can include encrypting the data to be transmitted and other operations related to encoding, transmission, or encryption of the data). The term "receiver" is used herein in a broad sense to denote any device capable of receiving and decoding data that has been transmitted over a serial link (and optionally also performing additional functions, which can include decrypting the received data and other operations related to decoding, reception, or decryption of the received data). For example, the term transmitter can denote a transceiver that performs the functions of a receiver as well as the functions of a transmitter. In a more specific example, the term transmitter (with reference to a device that transmits non-audio auxiliary data over a serial link) can denote a transceiver that is configured to receive video data and audio data over the link and to transmit the non-audio auxiliary data over the link.

Various serial links for transmitting data and clock signals are well known.

One conventional serial link, used primarily for high-speed transmission of video data from a host processor (e.g., a personal computer) to a monitor, is known as a transition minimized differential signaling interface ("TMDS" link). The characteristics of a TMDS link include the following:

1. video data are encoded and then transmitted as encoded words (each 8-bit word of digital video data is converted to an encoded 10-bit word before transmission);

a. the encoding determines a set of "in-band" words and a set of "out-of-band" words (the encoder can generate only "in-band" words in response to video data, although it can generate "out-of-band" words in response to control or sync signals. Each in-band word is an encoded word resulting from encoding of one input video data word. All words transmitted over the link that are not in-band words are "out-of-band" words);

b. the encoding of video data is performed such that the in-band words are transition minimized (a sequence of in-band words has a reduced or minimized number of transitions);

c. the encoding of video data is performed such that the in-band words are DC balanced (the encoding prevents each transmitted voltage waveform that is employed to transmit a sequence of in-band words from deviating by more than a predetermined threshold value from a reference potential. Specifically, the tenth bit of each "in-band" word indicates whether eight of the other nine bits thereof have been inverted during the encoding process to correct for an imbalance between running counts of ones and zeroes in the stream of previously encoded data bits);

2. the encoded video data and a video clock signal are transmitted as differential signals (the video clock and encoded video data are transmitted as differential signals over conductor pairs);

3. three conductor pairs are employed to transmit the encoded video, and a fourth conductor pair is employed to transmit the video clock signal; and 4. signal transmission occurs in one direction, from a transmitter (typically associated with a desktop or portable computer, or other host) to a receiver (typically an element of a monitor or other display device).

Another serial link is the "High Definition Multimedia Interface" interface ("HDMI" link) developed Silicon Image, Inc., Matsushita Electric, Royal Philips Electronics, Sony Corporation, Thomson Multimedia, Toshiba Corporation, and Hitachi.

Another serial link is the "Digital Visual Interface" interface ("DVI" link) adopted by the Digital Display Working Group. It will be described with reference to FIG. 1. A DVI link can be implemented to include two TMDS links (which share a common conductor pair for transmitting a video clock signal) or one TMDS link, as well as additional control lines between the transmitter and receiver. The DVI link of FIG. 1 includes transmitter 1, receiver 3, and a cable (comprising connectors 120 and 121 and conductor set 122) between the transmitter and receiver. Conductor set 122 comprises four conductor pairs (Channel 0, Channel 1, and Channel 2 for video data, and Channel C for a video clock signal), Display Data Channel ("DDC") lines for bidirectional communication between the transmitter and a monitor associated with the receiver in accordance with the conventional Display Data Channel standard (the Video Electronics Standard Association's "Display Data Channel Standard," Version 2, Rev. 0, dated Apr. 9, 1996), a Hot Plug Detect (HPD) line (on which the monitor transmits a signal that enables a processor associated with the transmitter to identify the monitor's presence), Analog lines (for transmitting analog video to the receiver), and Power lines (for providing DC power to the receiver and a monitor associated with the receiver). The Display Data Channel standard specifies a protocol for bidirectional communication between a transmitter and a monitor associated with a receiver, including transmission by the monitor of an Extended Display Identification ("EDID") message that specifies various characteristics of the monitor, and transmission by the transmitter of control signals for the monitor. Transmitter 1 includes three identical encoder/serializer units (units 2, 4, and 6) and additional circuitry (not shown). Receiver 3 includes three identical recovery/decoder units (units 8, 10, and 12) and inter-channel alignment circuitry 14 connected as shown, and additional circuitry (not shown).

As shown in FIG. 1, circuit 2 encodes the data to be transmitted over Channel 0, and serializes the encoded bits. Similarly, circuit 4 encodes the data to be transmitted over Channel 1 (and serializes the encoded bits), and circuit 6 encodes the data to be transmitted over Channel 2 (and serializes the encoded bits). Each of circuits 2, 4, and 6 responds to a control signal (an active high binary control signal referred to as a "data enable" or "DE" signal) by selectively encoding either digital video words (in response to DE having a high value) or a control or synchronization signal pair (in response to DE having a low value). Each of encoders 2, 4, and 6 receives a different pair of control or synchronization signals: encoder 2 receives horizontal and vertical synchronization signals (HSYNC and VSYNC); encoder 4 receives control bits CTL0 and CTL1; and encoder 6 receives control bits CTL2 and CTL3. Thus, each of encoders 2, 4, and 6 generates in-band words indicative of video data (in response to DE having a high value), encoder 2 generates out-of-band words indicative of the values of HSYNC and VSYNC (in response to DE having a low value), encoder 4 generates out-of-band words indicative of the values of CTL0 and CTL1 (in response to DE having a low value), and encoder 6 generates out-of-band words indicative of the values of CTL2 and CTL3 (in response to DE having a low value). In response to DE having a low value, each of encoders 4 and 6 generates one of four specific out-of-band words indicative of the values 00, 01, 10, or 11, respectively, of control bits CTL0 and CTL1 (or CTL2 and CTL3).

It has been proposed to encrypt video data transmitted over a serial link. For example, it has been proposed to use a cryptographic protocol known as "High-bandwidth Digital Content Protection" ("HDCP") to encrypt digital video to be transmitted over a DVI link and to decrypt the data at the DVI receiver. A DVI transmitter implementing HDCP outputs a 24-bit bus, known as cout[23:0], during the video active period (i.e. when DE is high). This 24-bit cout data is "Exclusive Ored" (in logic circuitry in the transmitter) with the 24-bit RGB video data input to the transmitter in order to encrypt the video data. The encrypted data is then encoded (according to the TMDS standard) for transmission. The same cout data is also generated in the receiver. After the encoded and encrypted data received at the receiver undergoes TMDS decoding, the cout data is processed together with the decoded video in logic circuitry in order to decrypt the decoded data and recover the original input video data.

Typically, the primary data transmitted by a TMDS link are video data. The video data are not continuous, and instead have blanking intervals. These blanking intervals provide an opportunity for auxiliary data to be transported, and they represent unused bandwidth. However, many serial links do not transmit data having blanking intervals, and thus do not encode input data (for transmission) in response to a data enable signal. For example, audio serial links would typically transmit continuous data.

In some systems of the type described in above-referenced U.S. patent application Ser. No. 10/171,860, a serial link is coupled between a transmitter and a receiver, and the transmitter sends video data, packetized audio data, and a video clock over the link to the receiver. Circuitry in the transmitter uses the video clock to generate cycle time stamps (for use in regenerating an audio clock for the audio data) and the transmitter transmits "time stamp" data (data indicative of the cycle time stamps) to the receiver over the link. The receiver is configured to regenerate an audio clock for the audio data in response to the time stamp data and video clock. Each cycle time stamp ("CTS") is the number of video clock cycles in a defined (predetermined) audio period. The audio period is typically $$N/(128*Fs)$$

where Fs is the audio sample frequency and N is a user-specified number, in which case each CTS value is:

$$CTS=(N*Fp)/(128*Fs)$$

where Fp is the video clock frequency. A video clock is sometimes referred to herein as a "pixel clock," and the frequency of a video clock (e.g., "Fp") is sometimes referred to herein as a "pixel clock frequency."

We will use the expression "embedded-clock audio stream" (or "embedded-clock audio data") to denote audio data stream (e.g., an SPDIF audio stream) in which an audio clock is embedded such that the audio clock is not readily available, and the expression "embedded-clock auxiliary data stream" (or "embedded-clock audio data") to denote a stream of auxiliary data in which an auxiliary data clock is embedded such that the auxiliary data clock is not readily available. In the case that an embedded-clock audio stream (e.g., an SPDIF audio stream) is input to a transmitter, and no audio clock for the input audio is separately provided to the transmitter (e.g., from an external device), circuitry in the transmitter is needed to extract an audio clock from the input audio, for use in generating the CTS values. If the extracted audio clock has frequency Z*Fs, the transmitter could generate a sequence of CTS values by repeatedly counting the number of video clock cycles in N cycles of the audio clock. If the frequency of the extracted audio clock were a multiple of Z*Fs, such as 2Z*Fs or 3Z*Fs, a divider circuit could be employed to generate a desired Z*Fs clock from the extracted clock.

A phase-locked loop (PLL) could be employed to extract an audio clock from an embedded-clock audio stream.

However, it is difficult and costly to implement a suitable PLL in a typical transmitter for this purpose. Including such a PLL in the transmitter would add significantly to the cost of designing and manufacturing the transmitter. Inclusion of a PLL in an integrated circuit (configured to generate a sequence of CTS values from a video clock and an SPDIF or other embedded-clock audio stream) would consume costly integrated circuit real estate and development resources, and would add integration complexities to the integrated circuit.

SUMMARY OF THE INVENTION

In a class of embodiments, the invention is a system including a transmitter, a receiver, and a serial link between the transmitter and receiver. The transmitter is configured to transmit video data, embedded-clock auxiliary data (or auxiliary data derived from embedded-clock auxiliary data), and a video clock over the link to the receiver. The transmitter is also configured to generate (and transmit) time stamp data (indicative of cycle time stamps) by using the video clock to measure auxiliary data clocking information determined by a sample clock extracted (by the transmitter) from the embedded-clock auxiliary data without use of a phase-locked loop ("PLL"), where the term "extracted" is used in a broad sense to denote extracted or recreated in any manner.

Typically, the embedded-clock auxiliary data are embedded-clock audio data. In some embodiments, the transmitter is configured to transmit audio samples derived from embedded-clock audio data, together with time stamp data (of the type described in the previous paragraph) for the audio samples. In some such embodiments, the transmitted audio samples are generated by stripping periodically-occurring preambles from the embedded-clock audio data.

In preferred embodiments, the transmitter includes circuitry configured to generate a sample clock that changes state in response to each (or each Nth) occurrence of a code that occurs periodically in a stream of embedded-clock auxiliary data. Typically, the code occurs once per sample period in the auxiliary data. In such embodiments, the transmitter is configured to use the sample clock and a video clock to generate time stamp data which (with the video clock) determine an auxiliary data clock for the auxiliary data. The transmitter transmits the time stamp data and the video clock to the receiver over the link, and the receiver is configured to generate an auxiliary data clock for the auxiliary data in response to the time stamp data and the video clock. The inventive method for generating time stamp data in response to embedded-clock auxiliary data eliminates the need to implement an auxiliary data sample clock recovery PLL in the transmitter and simplifies the circuitry (e.g., logic) needed in the transmitter for determining time stamp data for embedded-clock auxiliary data.

In typical embodiments, the auxiliary data that are input to the transmitter are (or include) a stream of embedded-clock audio data having a sample frequency, Fs, the time stamp data are indicative of time stamps, and each time stamp is a number of video clock cycles in a defined audio period. The transmitter is configured in accordance with the invention to determine the number of video clock cycles in the defined audio period from the audio data (and a video clock) without using a PLL to extract a clock from the audio data. Typically, the defined audio period is $P=X/(Y*Fs)$, where X and Y are integers.

In a class of embodiments, the transmitter includes circuitry configured to generate a sample clock that changes state in response to each (or each Nth) occurrence of a code that occurs periodically in a stream of embedded-clock auxiliary data, and circuitry configured to use the sample clock as a periodic timing reference (whose frequency is the sample frequency, Fs, or a known fraction thereof) to count the number of video clock cycles between occurrences of the code (which is equivalent to evaluating Fp/Fs, where Fp is the video clock frequency) thereby generating cycle time stamp (CTS) values indicative of the counts. Each CTS value can be determined in any of a number of ways, each indicative of (Fp/Fs) or a fraction or multiple thereof. In some embodiments, each CTS value is determined by counting the number of cycles of the video clock between an initial occurrence of the code and the Nth occurrence of the code after the initial occurrence (equivalent to evaluating $N*(Fp/Fs)$) and dividing the result by Y (equivalent to evaluating $CTS=(N*Fp)/(Y*Fs)$). Typically, Y=128. In other embodiments, each CTS value is determined by counting the number of video clock cycles between an initial occurrence of the code and the (N/Y)th occurrence of the code after the initial occurrence. If (N/Y) is not a whole number, the whole number portion of $(N/Y)*(Fp/Fs)$ can be accumulated, the number of video clock cycles occurring before the next occurrence of the code then counted, and the appropriate fraction of the latter count (as determined from the fractional part of N/Y) added to the accumulation to yield the CTS value.

Other aspects of the invention are a transmitter for use in any embodiment of the inventive system, a CTS value generation circuit for use in such a transmitter, and a method for generating a CTS value in response to a stream of embedded-clock auxiliary data (e.g., embedded-clock audio data) and a video clock. The inventive cycle time stamp generation circuit is configured to determine the number of video clock cycles in a defined auxiliary data period (e.g., a defined audio period) from an SPDIF audio data stream (or other embedded-clock auxiliary data stream) and a video clock.

In preferred embodiments of the invention, time stamp data are generated from an SPDIF audio data stream having a sample frequency, Fs, and a video clock. Synchronization codes embedded in the SPDIF audio data stream are used to generate a value indicative of the number of video clock cycles in a defined audio period. Typically, the audio period is $P=N/(Y*Fs)$, where N and Y are integers. In preferred embodiments, Y=128, and N satisfies $(128*Fs)/1500 \text{ Hz} \leq N \leq (128*Fs)/300 \text{ Hz}$.

In an SPDIF audio data stream, the start of each sub-frame is marked by a preamble sequence, as fully described in the specification of the well-known IEC 60958 standard. Each block of SPDIF data consists of a number of frames, each frame comprising two sub-frames. Each sub-frame is a 32-bit word comprising a 4-bit preamble followed by 28 bits (including a 20-bit audio data sample). The preamble can be any one of three 4-bit codes: a "B" value which marks a 32-bit word which is the first sub-frame of a block and contains a sample of channel 1 data (a "left" channel sample of stereo data); an "M" value which marks a 32-bit word which is not the first sub-frame of a block but which contains a sample of channel 1 data; or a "W" value which marks a 32-bit word containing a sample of channel 2 data (a "right" channel sample of stereo data).

In preferred embodiments, the transmitter of the invention includes circuitry configured to generate a sample clock signal that changes state in response to each "B," "M," and "W" preamble of an SPDIF audio data stream. The sample clock signal is used as a periodic audio timing reference whose frequency is the sample frequency, Fs, since the time elapsed for each sub-frame of the stream is one audio sample period. In such embodiments, the transmitter preferably includes circuitry configured to count the number of video clock cycles between occurrence of a "B," "M," or "W" preamble and occurrence of the next "B," "M," or "W" preamble, which is equivalent to evaluating (Fp/Fs), where Fp is the video clock frequency. Each CTS value can be determined in any of a number of ways, each indicative of (Fp/Fs) or a fraction or multiple thereof. In some embodiments, each CTS value is determined by counting the number of video clock cycles between occurrence of an initial "B," "M," or "W" preamble and the occurrence of the (2N)th "B," "M," or "W" preamble following the initial preamble (equivalent to evaluating N*(Fp/Fs)) and dividing the result by 128 (equivalent to evaluating CTS=(N*Fp)/(128*Fs)). In other embodiments, each CTS value is determined by counting the number of video clock cycles between occurrence of an initial "B," "M," or "W" preamble and the occurrence of the (2N/128)th "B," "M," or "W" preamble after the initial preamble. If (2N/128) is not a whole number, the whole number portion of (2N/128)*(Fp/Fs) can be accumulated, the number of video clock cycles occurring before the next "B," "M," or "W" preamble then counted, and the appropriate fraction of the latter count (as determined from the fractional part of 2N/128) added to the accumulation to yield the CTS value.

The sample clock signal generated in accordance with the invention can exhibit jitter due to a number of reasons (such as delay variations in determining the preamble of each sub-frame of SPDIF data, synchronization variations, and so on). Thus, in preferred embodiments, circuitry is provided for removing jitter from the sample clock signal, and the de-jittered sample clock signal is used (rather than the original, jitter-containing sample clock signal) as a reference to measure the number of video clock cycles per auxiliary data sample period or a multiple thereof.

In some embodiments, once CTS values are determined in accordance with the invention, additional processing is performed on them to minimize the variation among the CTS values. This can be done by averaging the CTS values (e.g., transmitting an averaged CTS value, $(CTS_1+CTS_2+ \ldots +CTS_L)/L$, rather than $CTS_L$ itself) or building hysteresis into the CTS values.

DETAILED DESCRIPTION OF THE
PREFERRED EMBODIMENTS

As noted above, the term "stream" of data (as used herein) denotes that all the data are of the same type and are transmitted with the same clock frequency, and the term "channel" (as used herein) refers to that portion of a serial link that is employed to transmit data (e.g., a particular conductor or conductor pair between the transmitter and receiver over which the data are transmitted, and specific circuitry within the transmitter and/or receiver used for transmitting and/or recovery of the data) and to the technique employed to transmit the data over the link.

When transmitting audio (or other auxiliary) data via a serial link, is it often desired to transmit multiple streams of the auxiliary data, and it is often valuable for multiple channels of the link to be available for transmission of the auxiliary data. For example, there can be two audio streams (left and right streams of stereo audio), six streams (e.g., those of "5.1" surround sound), or up to eight streams (e.g., those of "7.1" surround sound). Alternatively, it may be desired to transmit even more streams of audio data with video, or to transmit streams of non-audio auxiliary data (for providing non-audio effects that are synchronized to the video) with audio and video. All such streams of auxiliary data are typically on the same time base, but alternatively there can be a need for some of the audio (or other auxiliary) data to be based upon another time base, or to have a different sampling rate. For example transmission of six streams of pulse code modulated (PCM) audio data over the link can be based upon one clock. Another two streams of compressed audio data, possibly a down-mix (for playback on a reduced number of speakers), might be transmitted with the video and PCM data as well.

In high-speed serial digital data transmission the data are often encoded to maximize or minimize the number of transitions and to also balance the DC level. For example, in embodiments of the inventive system that include at least one TMDS link, transition-minimized, DC-balanced, TMDS encoded video data are transmitted over each of three channels of the TMDS link, and encoded auxiliary data (e.g., audio data) can be transmitted over one or more of these three channels during blanking intervals between the active video periods.

Figure 1:
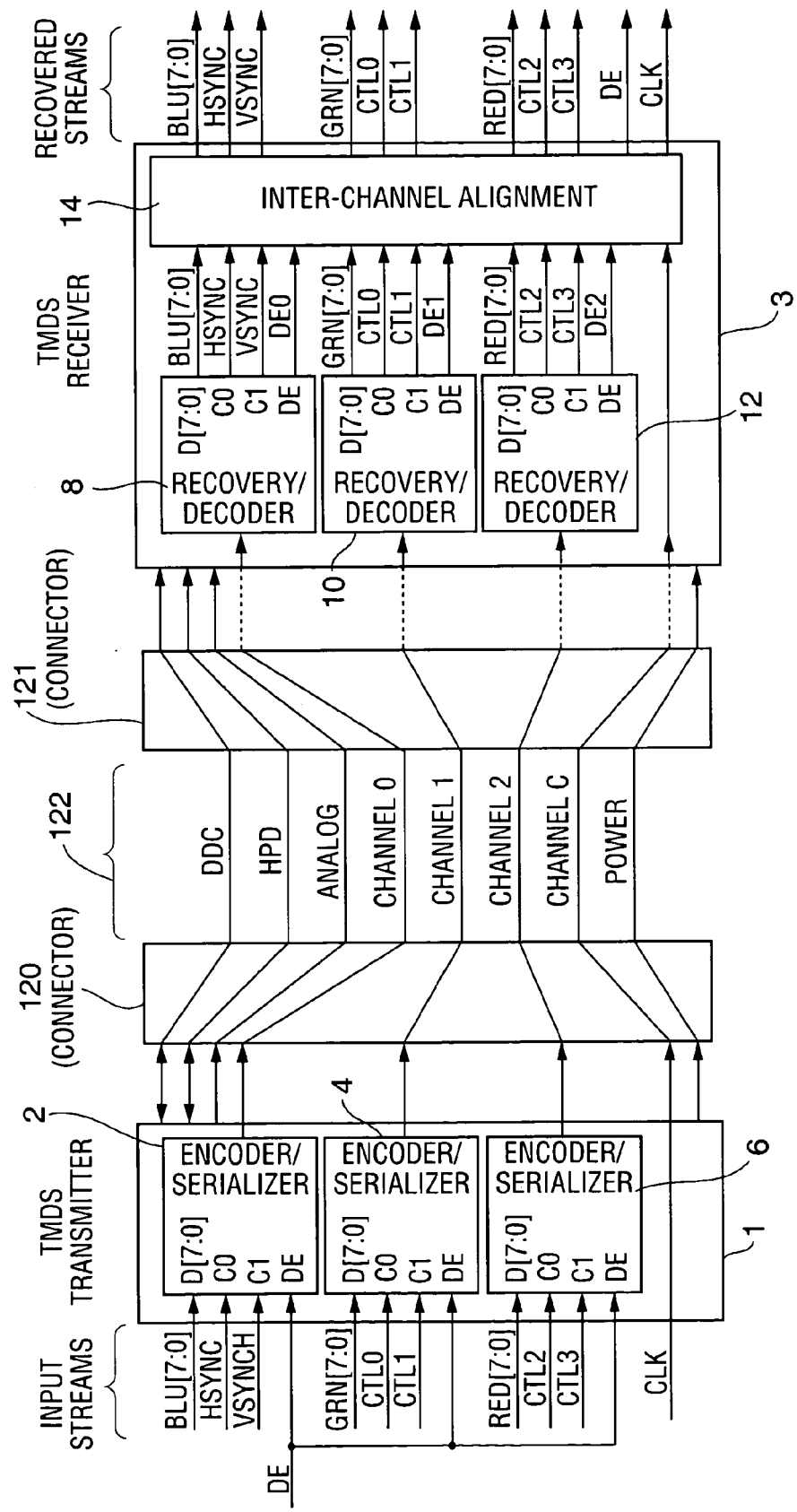
FIG. 1 is a block diagram of a conventional system including a Digital Visual Interface ("DVI") link.
Figure 2:
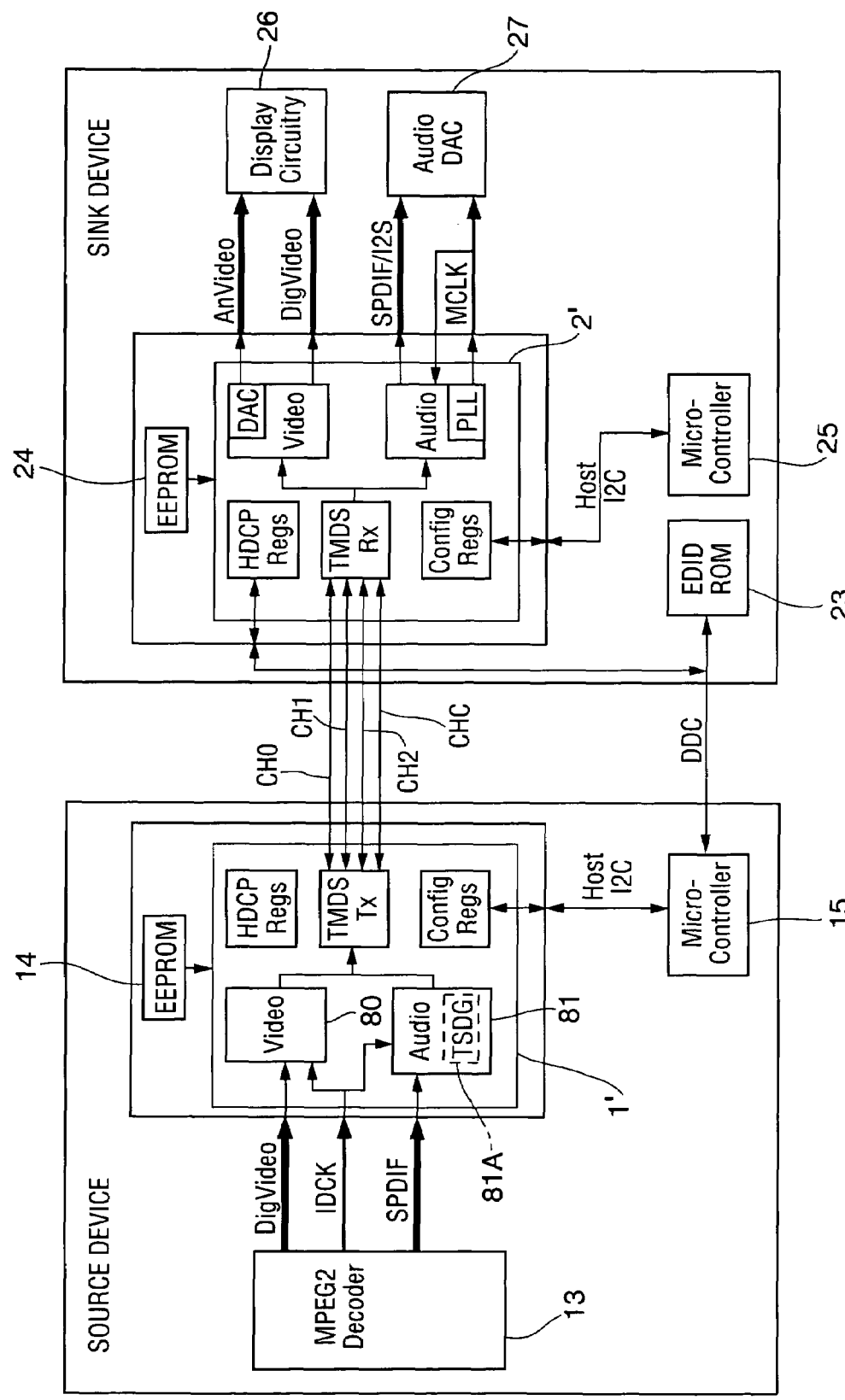
FIG. 2 is a block diagram of an embodiment of the inventive system.

A class of embodiments of the invention can be implemented by a system of a type shown in FIG. 2. The TMDS link between transmitters 1' and 2' of FIG. 2 is identical to the TMDS link between transmitters 1 and 3 in FIG. 1, although some of the conductors thereof are shown in FIG. 1 but not in FIG. 2 (for simplicity). The FIG. 2 system performs the functions of the FIG. 1 system, and is also configured to encode audio data (or other auxiliary data) as well as to encode video data in the same conventional manner as in the FIG. 1 system, to transmit the encoded auxiliary data over one or more of Channel 0, Channel 1, and Channel 2 of the TMDS link (and also transmit encoded video data over each such channel), and to decode the encoded auxiliary data (as well as the encoded video data).

Transmitter 1' and receiver 2' of FIG. 2 correspond, respectively, to transmitter 1 and receiver 3 of FIG. 1, but perform auxiliary data encoding, transmission, and decoding functions that are not performed by transmitter 1 and receiver 3. Transmitter 1' of FIG. 2 is an element of a source device that also includes MPEG2 decoder 13 and microcontroller 15, coupled as shown. Decoder 13 asserts input video ("DigVideo"), and a pixel clock ("IDCK") for the input video, to video data processing subsystem 80 of transmitter 1'. Decoder 13 also asserts input audio data ("SPDIF") to audio data processing subsystem 81 of transmitter 1'. The input audio SPDIF (which are in SPDIF format) are typically indicative of two or more streams of audio data (e.g., left and right stereo signals). EEPROM 14 stores key values and identification bits for use in HDCP encryption of content to be transmitted to receiver 2'.

Audio data processing subsystem 81 includes circuitry 81A, which is an embodiment of the inventive time stamp data generation circuitry. Time stamp data generation circuitry 81A is configured to generate time stamp data in response to the input audio SPDIF and the pixel clock IDCK. Subsystem 81 packetizes the time stamp data with the input audio data, and the resulting packets are encoded (optionally after undergoing encryption in encryption circuitry in subsystem 81) and then transmitted to receiver 2'.

Optionally, non-audio auxiliary data are asserted as input data to audio data processing subsystem 81 (instead of or in addition to input audio data), and subsystem 81 is configured to include such auxiliary data in the packets that are encoded and transmitted to receiver 2'.

Receiver 2' is an element of a sink device that also includes EDID ROM 23, microcontroller 25, display circuitry 26, and audio digital-to-analog converter 27 ("DAC" 27), coupled as shown in FIG. 2. EDID ROM 23 is coupled to the DDC channel of the TMDS link, and stores status and configuration bits which can be read by microcontroller 15 over the DDC channel. Receiver 2' also includes an interface (e.g., interface 201 of FIG. 4) for communication via the DDC channel with microcontroller 15. Microcontroller 25 is coupled for I2C communication with receiver 2'. EEPROM 24 stores key values and identification bits for use in HDCP decryption of content received from transmitter 1'.

The sink device also includes display circuitry 26 which receives analog and/or digital video recovered by receiver 2', and an audio digital-to-analog converter (DAC) 27 which receives digital audio recovered by receiver 2'.

In typical operation, transmitter 1' of FIG. 2 transmits video data to receiver 2' over Channels 0, 1, and 2 of a TMDS link during active video periods, transmits audio data (e.g., left and right stereo signals) or other auxiliary data over one or more of Channels 0, 1, and 2 to receiver 2' at times other than during the active video periods, continuously transmits a pixel clock (e.g., determined by the rising edges of a binary waveform) over Channel C of the link, and transmits time stamp data (over one or more of Channels 0, 1, and 2) with the auxiliary data. The time stamp data (with the transmitted pixel clock) determine a clock (an "audio" clock) for transmitted audio data (and/or any non-audio auxiliary data). Receiver 2' is configured to process the time stamp data with the pixel clock to regenerate the audio clock in a manner to be described below with reference to FIG. 5.

In the FIG. 2 system, transmitter 1' preferably encodes 8-bit source words of video data into transition-minimized 10-bit code words which are then serialized and transmitted over one of the conductor pairs identified as Channels 0, 1, and 2. In receiver 2', each 10-bit code word is decoded back to the original 8-bit word if no errors are present. Each code word comprises a 9-bit base pattern (a transition-minimized member of a set of $2^9$ nine-bit patterns, whose most significant bit indicates that the base pattern is transition-minimized) concatenated with a tenth bit indicating whether the eight least-significant bits of the base pattern have or have not been inverted in accordance with a DC balancing algorithm. In transmitter 1', each 8-bit source word is first encoded to one of the 9-bit base patterns, and a stream of the 9-bit base patterns are then encoded as a stream of the 10-bit code words.

In a class of embodiments, transmitter 1' and receiver 2' distinguish between at least three portions of each blanking interval (between active video periods): an initial portion (in which a "data island preamble" can be transmitted) followed by an auxiliary data portion (sometimes referred to as a "data island") followed by a final portion (in which a "video preamble" can be transmitted). Optionally, there are two or more data islands in a blanking interval (each comprising at least one auxiliary "guard band" word followed by a burst of a different stream of encoded auxiliary data), an initial portion between the falling edge of DE (at the start of the blanking interval) and the start of the first data island, an additional portion (including another data island preamble) before each subsequent data island in the blanking interval, and a final portion (including a video preamble) between the last data island and the next active video period. Code words indicative of guard bands and preambles are chosen to have patterns such that a receiver can reliably identify each leading and trailing edge of each data island and each leading edge of an active video period.

In typical implementations of transmitter 1', 24-bit words of video data are provided from subsystem 80, and R-bit packets (e.g., R=288) of auxiliary data are provided from subsystem 81, to the transmitter's encoding circuitry for encoding. The video data are typically encoded differently than the auxiliary data. For example, eight bits of each video data word are encoded, serialized, and transmitted on channel CH2 (as a 10-bit encoded word), another eight bits of each such word are encoded, serialized, and transmitted on channel CH1 (as a 10-bit encoded word), and another eight bits of each such word are encoded, serialized, and transmitted on channel CH0 (as a 10-bit encoded word), whereas M-bit portions (e.g., M=4) of each auxiliary data packet are encoded, serialized, and transmitted (each as a 10-bit encoded word) on channel CH2, CH1, or CH0. In some implementations, the video data are in RGB format (and the red, green, and blue pixels are transmitted on channels CH2, CH1, and CH0, respectively). Alternatively, the video data that are encoded and then transmitted are in luminance-chrominance format.

During each cycle of the pixel clock (the signal "IDCK" in FIGS. 2 and 3), the bits of one 10-bit code word can be sequentially transmitted over each of channels CH0, CH1, and CH2. In some implementations, this is accomplished by using phase shifting circuitry to generate multiple, phase-shifted versions of the pixel clock IDCK which are then used (with the clock IDCK itself) to clock the encoding, transmission, and decoding operations. In other implementations, a clock having ten times the frequency of IDCK (but in phase with IDCK) is used to clock the encoding, transmission, and decoding operations, and one code bit is transmitted during each cycle of this faster clock.

Transmitter 1' operates in response to a video data enable signal (VDE) and an auxiliary data enable signal (AUX DE). When VDE=1 and AUX DE=0, video data are encoded, and serialized 10-bit words of the encoded video are transmitted over channels CH0, CH1, and CH2. When VDE=0 and AUX DE=1, auxiliary data are encoded, and serialized 10-bit words of the encoded auxiliary data are transmitted over channels CH0, CH1, and/or CH2. When VDE=0 and AUX DE=0, the transmitter ignores signals asserted to its data inputs and instead encodes (as 10-bit code words) control bit pairs asserted to its control inputs (e.g., bits CTL3 and CTL2, or bits CTL1 and CTL0, of FIG. 1), serializes these code words, and transmits the serialized code words over channels CH1 and CH2.

Figure 3:
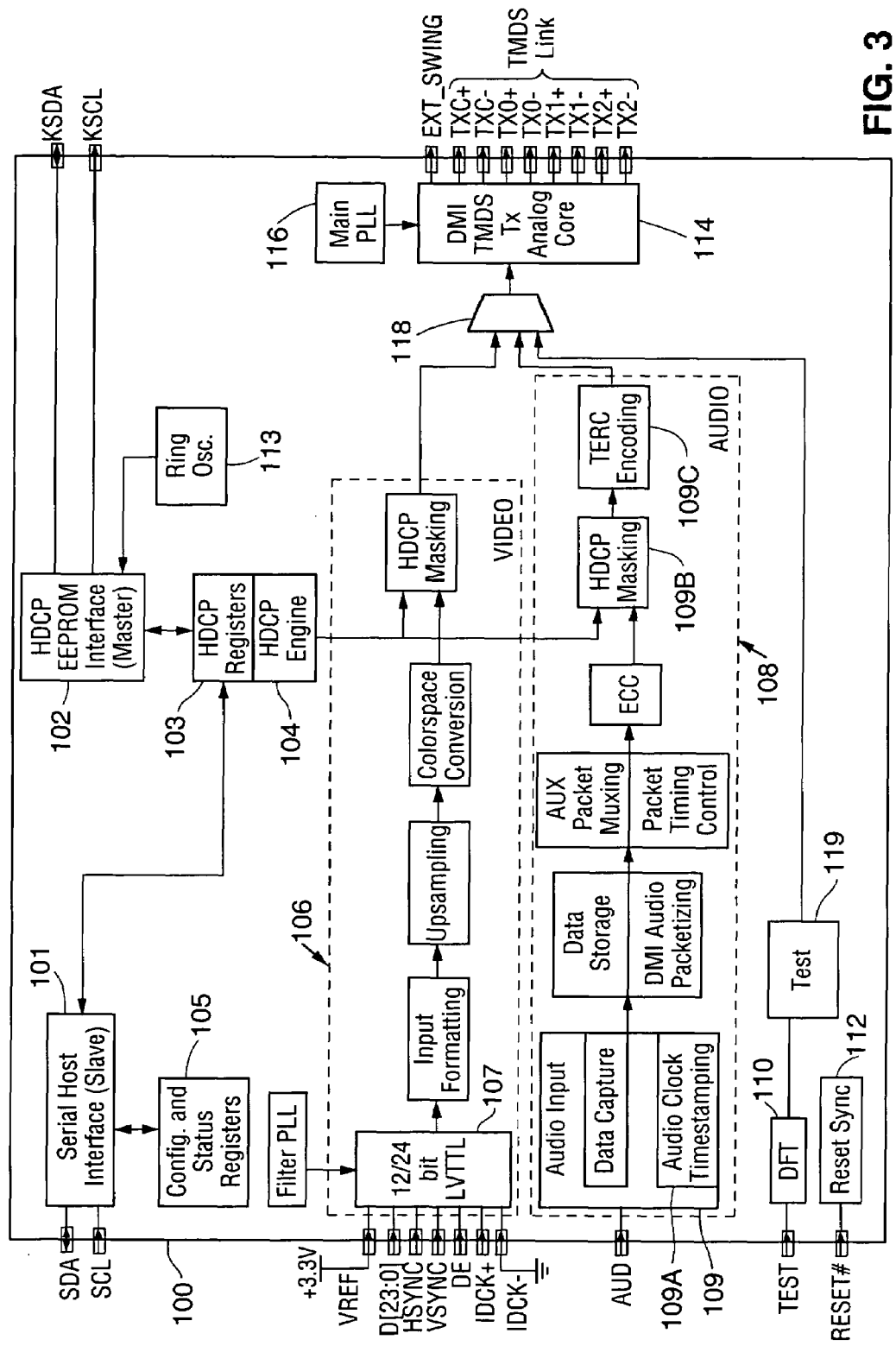
FIG. 3 is a block diagram of an embodiment of the inventive transmitter.

Although transmitter 1' is described in the previous paragraph with reference to two data enable signals, "VDE" and "AUX DE," the transmitter can be implemented with a portion (e.g., a "core" processor such as core processor 114 of transmitter 100 of FIG. 3) configured to perform all the encoding, serialization, and transmission in response to a single data enable signal (e.g., the signal "DE" in FIG. 3, which can be a combined enable signal indicative of the result of performing a logical "OR" operation on the signals VDE and AUX DE) and a single set of data inputs (e.g., the output of multiplexer 118 of FIG. 3) indicative of either video or auxiliary data. Additional circuitry (extra-core circuitry) of the transmitter outside the core processor can receive separate sets of auxiliary data (e.g., 24-bit input auxiliary data words) and video data (e.g., 24-bit input video data words), and both a video data enable signal (VDE) and an auxiliary data enable signal (AUX DE). The data enable signals can have the following repeating sequence of values: (VDE=0, AUX DE=0), then (VDE=1, AUX DE=0), then (VDE=0, AUX DE=0), and then (VDE=0, AUX DE=1). Or, the data enable signals can occur with other sequences of values, including non-repeating sequences. For example, in some circumstances, auxiliary data are transmitted in some but not all video blanking intervals. The extra-core circuitry of the transmitter can include logic circuitry that "ORs" together the signals VDE and AUX DE to produce a combined data enable signal. The extra-core circuitry can also pack the auxiliary data into 4-bit format (so that each 4-bit portion of the auxiliary data can be encoded as one 10-bit code word), add guard band words with appropriate timing into the stream of auxiliary data, and add video guard band words into the stream of video data (or alternatively replace, with appropriate timing, words of the video data stream with video guard band words). The extra-core circuitry can assert a sequence of bursts of the video data (with video guard band words) and auxiliary data (with guard band words) to the core processor ("core"), and also assert the combined data enable signal to the core. The core could perform encoding, serialization, and transmission operations in response to the combined data enable signal (rather than separate VDE and AUX DE signals) and the bursts of video and auxiliary data.

In typical systems that include an embodiment of the inventive transmitter, at least one packet of auxiliary data is transmitted from the transmitter during each data island. Typically each packet is transmitted over a period of 32 pixel clock cycles, and part of each packet is transmitted over each of channels CH0, CH1 and CH2 during the 32-pixel clock period. Typically, the transmitter can send one serialized 10-bit TMDS code word over each of channels CH0, CH1, and CH2 during each pixel clock cycle. Thus, each packet can include up to 96 (=3*32) 10-bit code words, each code word indicative of a 4-bit source word.

Typically, each packet consists of a header (which can be indicative of 32 source bits, including parity bits) followed by four subpackets (each of which can be indicative of 64 source bits, including parity bits). We sometimes use the expression that a packet or subpacket "contains" data to denote that the packet or subpacket is indicative of the data (e.g., the packet or subpacket includes code words indicative of the data).

One type of packet that can be transmitted is an audio clock regeneration (ACR) packet that contains a CTS (Cycle Time Stamp) value and an N value (described below), both for use for audio clock regeneration. An ACR packet can include a header followed by four identical subpackets. In some embodiments, each subpacket contains a 20-bit "N" value and a 20-bit "CTS" value. A CTS value equal to zero can indicate that there is no new CTS value.

Another type of packet that can be transmitted is an audio sample packet. An audio sample packet can include one, two, three, or four pairs of audio samples (each sample pair determined by a different subpacket of the packet). These can be different samples, different partial samples (e.g., 2 of 6 channels), or repeated samples. In some embodiments, bits in the second and third bytes of an audio sample packet's header indicate the configuration of each subpacket of the packet, whether each subpacket does or does not contain a sample, and whether each subpacket contains a "flatline" sample (i.e., one whose magnitude is zero). Each subpacket of an audio sample packet can contain channel status bits and parity bits as well as bits indicative of audio samples.

The audio data of each subpacket (of an audio sample packet) can be formatted as a structure that closely resembles an IEC_60958 or IEC_61937 frame, but with a "start" bit (in the packet header) replacing the multi-bit preamble of each sub-frame of an IEC_60958 or IEC_61937 frame. In some embodiments, each subpacket of an audio sample packet includes two 28-bit words (e.g., a 28-bit word of a left stereo stream and a 28-bit word of a right stereo stream), each 28-bit word corresponding to one of the two sub-frames of an IEC_60958 frame, and including 24 bits of audio data as well as a parity bit, a valid bit, a channel status bit, and a user data bit. All fields within each subpacket of an audio sample packet preferably follow corresponding rules specified in the IEC_60958 or IEC_61937 specification.

In some implementations, each of the four MSBs of the third byte of the packet header of an audio sample packet is a "start" bit indicating whether the corresponding subpacket contains the first frame of a block of IEC_60958 (or IEC_61937) frames of audio samples. The transmitter sets the start bit to "1" when the corresponding subpacket contains a first ("B") subframe of a block and clears the start bit to "0" when the corresponding subpacket contains a subframe ("M" or "W") that is not the first subframe of a block.

In some implementations, the inventive transmitter can transmit an IEC_60958 or IEC_61937 audio stream having sample rate of 32 kHz, 44.1 kHz or 48 kHz (which can determine a stereo or compressed surround-sound stream), and can transmit as many as four streams of IEC_60958 or IEC_61937 data (e.g., 8 stereo channels) at sample rates of up to 96 KHz, or at least one stream of IEC_60958 or IEC_61937 data at a sample-rate of 192 KHz.

FIG. 3 is a block diagram of transmitter 100, which is a preferred embodiment of transmitter 1' of FIG. 2. Transmitter 100 includes video subsystem 106 which performs pipelined encryption and other pipelined processing (e.g., reformatting, upsampling, and/or color space conversion) on video data D[23:0] received from an external source. Typically, a video clock (IDCK, referred to herein as a "pixel clock"), a video data enable signal (DE) and horizontal and vertical sync control signals (HSYNC and VSYNC) are received with the input video data from the external source. Transmitter 100 is typically configured to operate in response to a pixel clock having frequency in the range from 25 MHz to 112 MHz, but it is contemplated that transmitter 100 can alternatively be configured to operate in response to a pixel clock having higher frequency (e.g., 165 MHz or more). Subsystem 106 encrypts the input video data (or a reformatted or otherwise processed version of the input video) using pseudo-random values from cipher engine 104 and asserts the encrypted video to a first input of multiplexer 118. During operation, cipher engine 104 uses bits in registers 103. Registers 103 can be loaded with values received via interface 101 and/or interface 102.

Typically, interface 101 is coupled for I2C communication with a microcontroller (e.g., microcontroller 15 of FIG. 2). The microcontroller is also coupled to the DDC channel of a TMDS link, and to an input data source (e.g., a video source). Interface 101 can implement an I2C slave protocol to receive information and configuration bits (e.g., InfoFrame bits) and other bits (e.g., key values received during an HDCP authentication procedure), and load such bits into registers 105 and 103.

Where transmitter 100 is implemented as an integrated circuit, an EEPROM preloaded with key values and identification bits (to be used for decryption) can be implemented as a separate chip in a secure multi-chip module ("MCM") that includes both transmitter 100 and the EEPROM. An example of such an EEPROM is EEPROM 14 of FIG. 2. Interface 102 provides the interface between transmitter 100 and the EEPROM. Interface 102 can retrieve values from the EEPROM at appropriate times, such as during an HDCP authentication exchange with a receiver. Interface 102 preferably uses the output of ring oscillator 113 (typically having frequency 64 MHz, or frequency in the range 51.2 MHz to 76.8 MHz) to generate a clock (e.g., a 100 KHz clock) for use for I2C communication with the EEPROM.

Transmitter 100 also includes audio subsystem 108 which performs pipelined formatting, packetizing, encryption, and other pipelined processing on auxiliary data AUD received from an external source. Although data AUD can be (or include) auxiliary data other than audio data, it is typically audio data and we will refer to it as audio data for simplicity. In typical implementations, transmitter 100 can accept audio data AUD in S/PDIF (denoted alternatively as "SPDIF") format with sample rate Fs in the range from 32 kHz to 48 kHz, or in any of a number of other formats (e.g., 2-channel uncompressed PCM data or a compressed bitstream indicative of multi-channel data). A separate audio reference clock (some times referred to as a master clock or "MCLK") is sometimes received with input data AUD. However, in the case that input data AUD are embedded-clock audio data, a separate audio reference clock may not be received with the input data AUD.

In accordance with the invention, time stamp data generation circuitry 109A of interface 109 (of audio subsystem 108) generates time stamp data for the input data AUD, without using a PLL to extract an audio clock embedded in the input data AUD, in a manner to be described below. In some implementations, circuitry 109A generates a signal indicative of the number of cycles of pixel clock IDCK in the period 1/Fs or 1/(128*Fs), or more generally (N*M)/(Y*Fs), where Fs is the sample frequency of the input data AUD and N, M, and Y are integers, and circuitry 109A uses this signal to generate time stamp data.

Reset circuitry 112 of FIG. 3 is coupled to a reset pin for receiving a reset bit from an external processor. Transmitter 100 is preferably configured to reset itself to an initial state in response to a predetermined value of the reset bit. Test circuitry 110 is coupled to a test pin for receiving a test mode bit from an external source. Transmitter 100 is preferably configured to operate in either a test mode or a normal operating mode depending on the value of the test mode bit.

Main phase lock loop ("PLL") 116 generates a stabilized version of the pixel clock IDCK (which may have a different frequency than the pixel clock IDCK) for use by core 114 and optionally also other elements of transmitter 100.

Audio subsystem 108 can sample the audio data using the pixel clock IDCK, and generates time stamp data for the sampled audio data. Subsystem 108 generates packets that contain the sampled audio data and the time stamp data, encrypts the data in the packets (using encryption circuitry 109B), encodes the encrypted data (using encoding circuitry 109C), and asserts the packets containing encoded, encrypted data to a second input of multiplexer 118.

Subsystem 108 also determines the timing (relative to DE) with which data islands (each data island including one or more of the packets) are asserted to multiplexer 118. Subsystem 108 also time-division-multiplexes control words with the data islands, including control words indicative of: a data island preamble (e.g. subsystem 108 inserts eight pixel clock cycles of auxiliary data preamble words immediately before each data island), HSYNC and VSYNC (e.g., subsystem 108 inserts at least twelve pixel clock cycles of synchronization words before each burst of auxiliary data preamble words), leading and trailing data island guard bands (e.g., subsystem 108 inserts two pixel clock cycles of leading guard band words as the first two words of each data island and two pixel clock cycles of trailing guard band words as the last two words of each data island), a video preamble (e.g. subsystem 108 inserts video preamble words after each data island), and video guard bands (e.g., subsystem 108 inserts two pixel clock cycles of video guard band words after each video preamble).

In response to the DE signal received at interface 107 of video subsystem 106, or a control signal generated in response thereto, multiplexer 118 passes either video data from subsystem 106 (when DE is high) or the output of subsystem 108 (when DE is low) to TMDS core processor 114.

Figure 4:
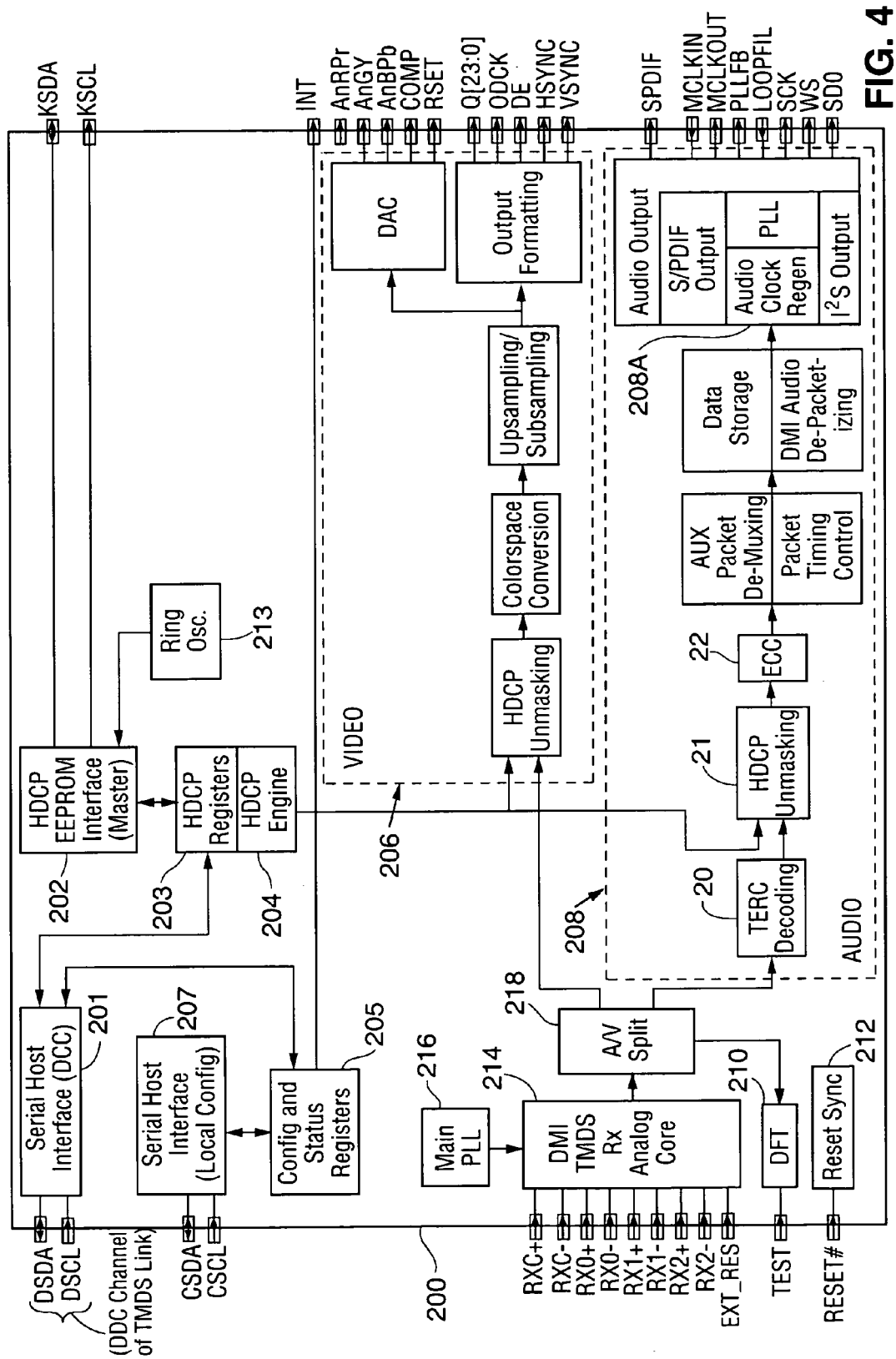
FIG. 4 is a block diagram of a receiver for use with the transmitter of FIG. 3.

Core processor 114 operates in response to the stabilized clock (generated by PLL 116) and preferably performs the operations of encoding 8-bit data words as 10-bit TMDS code words, serializing the data, and transmitting the serialized encoded data (and the pixel clock) over a TMDS link to receiver (e.g., to receiver 200 of FIG. 4).

FIG. 4 is a block diagram of receiver 200, which is a preferred embodiment of receiver 2' of FIG. 2. As shown in FIG. 4, receiver 200 includes core processor 214 which in operation is coupled to the TMDS link. Processor 214 recovers the pixel clock from the link's clock channel, and main PLL 216 generates a stabilized pixel clock (for use by interface 214, audio subsystem 208, and other elements of receiver 200) in response to the recovered pixel clock. In response to the stabilized recovered pixel clock, processor 214 preferably performs the above-described operations of de-serializing the data received over the link, decoding the de-serialized 10-bit TMDS code words to recover 8-bit code words, and asserting the 8-bit code words to splitting unit 218.

Unit 218 also receives a signal indicative of DE, and the stabilized recovered pixel clock, from processor 214. Unit 218 detects the beginning and end of each data island and each active video period in the code word stream from processor 214 (including by identifying guard bands and preamble code words), routes each audio data packet (of each data island) to pipelined audio subsystem 208, and routes the remaining data (including all bursts of video data) to pipelined video subsystem 206. In some operating modes, the data asserted by unit 218 to subsystem 206 includes HSYNC and VSYNC code words.

Video subsystem 206 performs decryption and other processing (e.g., reformatting, upsampling or subsampling, and/or color space conversion) on the video data received from unit 218. Subsystem 206 decrypts the video data from unit 218 (to generate 8-bit decrypted words) using pseudo-random values from cipher engine 204 and asserts the decrypted video to the pipelined circuitry for performing other processing (e.g., reformatting, subsampling, and color space conversion) thereon. The latter circuitry outputs the decrypted, processed video bits Q[23:0], typically after final reformatting, and with corresponding DE, HSYNC, and VSYNC signals and a pixel clock. Optionally, subsystem 206 also includes a digital-to-analog converter that generates and outputs analog video signals (AnRPr, AnGY, and AnBPb), which can be red, green, and blue color component signals or luminance and chrominance signals, in response to 8-bit decrypted and processed video words. During operation, cipher engine 204 uses bits in registers 203. Registers 203 can be loaded with values received via interface 201 and/or interface 202.

Where receiver 200 is implemented as an integrated circuit, an EEPROM preloaded with key values and identification bits (to be used for decryption) can be implemented as a separate chip in a secure multi-chip module ("MCM") that includes both receiver 200 and the EEPROM. An example of such an EEPROM is EEPROM 24 of FIG. 2. Interface 202 provides the interface between receiver 200 and the EEPROM. Interface 202 can retrieve values from the EEPROM at appropriate times, such as during an HDCP authentication exchange with the transmitter. Interface 202 preferably uses the output of ring oscillator 213 (typically having frequency 64 MHz, or frequency in the range 51.2 MHz to 76.8 MHz) to generate a clock for use for I2C communication with the EEPROM.

Interface 201 can be coupled to the DDC channel of the TMDS link, and can implement an I2C slave protocol to communicate with the transmitter over the DDC channel (for example, to perform HDCP authentication including by loading key values received from the transmitter over the DDC channel into registers 203.

Optionally, when receiver 200 is a repeater (configured to operate as a transmitter that sends data to another receiver, in addition to being configured to receive data from transmitter 100), receiver 200 includes interface 207. Interface 207 can be coupled to a host device and can implement an I2C slave protocol to receive information and configuration bits and load such bits into registers 205 and 203. When appropriate (i.e., in response to predetermined status, information, or error conditions), interrupts ("INT") are asserted from registers 205 to a host device to request software attention.

Receiver 200 of FIG. 4 includes pipelined audio subsystem 208, which receives and processes packets of auxiliary data from splitter unit 218. Typically, some of the packets include encrypted code words indicative of time stamp data and/or audio data. Subsystem 208 includes mapping and decoding circuitry 20 (which decodes the code words received from unit 218), decryption circuit 21 (which receives and decrypts 8-bit decoded words from circuitry 20), and error correction circuitry 22. Circuitry 22 is coupled and configured to receive the decrypted, decoded words output from circuit 21 and to assert error-corrected versions thereof to de-packetizing circuitry within subsystem 208. In variations on the FIG. 4 implementation of receiver 200, error correction is not performed and circuitry 22 is omitted.

Audio subsystem 208 decodes 8-bit code words in the packets to determine a 4-bit word indicated by each 8-bit code word, and combines pairs of the resulting 4-bit words to determine the 8-bit word indicated by each pair of 8-bit code words (when the transmitter employed 4 bit-to-10 bit encoding to encode the audio data), or decodes 8-bit code words in the packets to determine a 2-bit word indicated by each 8-bit code word, and combines pairs of the resulting 2-bit words to determine the 4-bit word indicated by each pair of 8-bit code words (when the transmitter employed 2 bit-to-10 bit encoding to encode the audio data). Subsystem 208 also decrypts the decoded audio samples (using pseudo-random bits from cipher engine 204), performs error correction on the decrypted, decoded samples, unpacks the error-corrected, decrypted, decoded samples from the packets (and routes configuration and status bits that are unpacked from the packets to appropriate registers), and performs other processing on the unpacked audio samples (for example, by organizing the audio data for S/PDIF (SPDIF) and I$^2$S output engines and then processing the organized data in one or both of such engines to generate output data in one or both of S/PDIF or I$^2$S format). Typically, subsystem 208 can output audio data in any of a number of different formats (e.g., as 2-channel uncompressed PCM data or as a compressed bitstream indicative of multi-channel data). In different operating modes, subsystem 208 asserts (with the output audio data) one or more of a bit clock ("SCK") whose frequency is the audio bit rate, an audio reference clock ("MCLK") which is a regenerated version of an audio clock for the audio data AUD (e.g., a clock having frequency Z*Fs, where Fs is the audio sample frequency, and Z is an integer. Typically, Z=Y*128, where Y is a small integer such as 1, 2 or 3), a serial data output clock (SDO) for use in demultiplexing a time-division multiplexed output audio data stream indicative of two audio channels, and/or a word select clock ("WS"). Audio clock regeneration circuitry 208A (in subsystem 208) performs the audio clock regeneration in response to time stamp data from the packets of audio data and the pixel clock from PLL 216.

Reset circuitry 212 is coupled to a reset pin for receiving a reset bit from an external processor. Receiver 200 is preferably configured to reset itself to an initial state in response to a predetermined value of the reset bit. Test circuitry 210 is coupled to a test pin for receiving a test mode bit from an external source. Receiver 200 is preferably configured to operate in either a test mode or a normal operating mode depending on the value of the test mode bit.

In preferred embodiments, receiver 200 implements equalization by filtering the incoming signals on channels CH0, CH1, and CH2 of a TMDS link in a manner designed to compensate for the degradation that the signals suffer during propagation (typically over a long cable) from the transmitter to the receiver. For example, a preferred implementation of core processor 214 of receiver 200 of FIG. 4 includes an equalization filter that compensates for (and preferably cancels) the filtering effects of the cable to which the receiver is coupled.

Receiver 200 preferably includes error correction circuitry (e.g., circuitry 22 of subsystem 208 of FIG. 4) for correcting detected errors in the audio data (or other auxiliary data) transmitted in data islands. Receiver 200 optionally also includes error correction circuitry for correcting detected errors in video data transmitted during active video periods.

S/PDIF data are embedded-clock auxiliary data. In preferred embodiments, the inventive transmitter is configured to sample an input stream of S/PDIF data (typically, S/PDIF audio data) with a pixel clock having no known phase relationship with the clock embedded among the S/PDIF data, and then to transmit the pixel-clock-sampled data. For example, interface 109 of transmitter 100 of FIG. 3 is preferably configured to sample an input stream of S/PDIF audio data using the pixel clock IDCK so that the pixel-clock-sampled data can be packetized, encoded, and transmitted. In alternative embodiments, the inventive transmitter is configured to sample an input stream of S/PDIF data with an audio reference clock having frequency of at least 256*Fs (or 384*Fs in preferred embodiments), where Fs is the sample rate of the S/PDIF data, where the audio reference clock has no known phase relationship with the clock embedded among the input data.

In some embodiments, the inventive transmitter is configured to accept and synchronize multiple independent, synchronizable S/PDIF streams.

Preferably, a receiver for use with the inventive transmitter is configured to output S/PDIF format data in response to received packets of data.

In typical embodiments of the invention, transmission of auxiliary data (e.g., audio data) over a serial link is driven by a pixel clock only, and an auxiliary data clock for the auxiliary data is generated at the receiver. In the case that the auxiliary data are (or include) audio data, the auxiliary data clock is generated at the receiver by an operation known as Audio Clock Regeneration ("ACR"). We next describe preferred methods and circuitry for generating time stamp data (in a transmitter) for audio data being (or to be) transmitted, and for accomplishing ACR in a receiver using transmitted time stamp data and a transmitted pixel clock. We shall describe the methods and circuitry with reference to transmitter 100 of FIGS. 3 and 5, and receiver 200 of FIGS. 4 and 5 (although the methods and circuitry can be implemented in other transmitters and receivers) in the case that the auxiliary data are audio data (although the description applies equally well to the case that the auxiliary data are not audio data).

Figure 5:
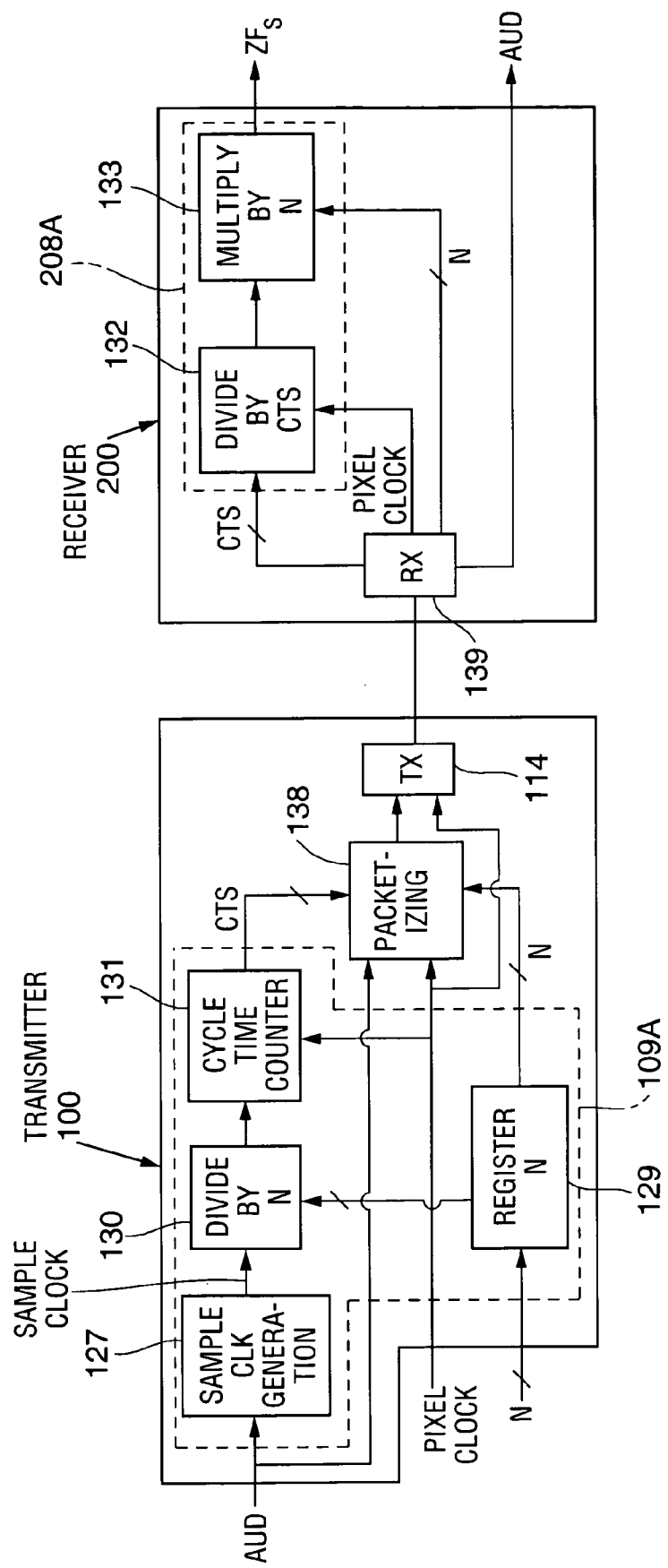
FIG. 5 is a block diagram of the auxiliary data clock transmission and regeneration circuitry employed in an embodiment of the inventive system that includes the transmitter of FIG. 3 and the receiver of FIG. 4.

In FIG. 5, some elements of transmitter 100 and receiver 200 are shown (numbered identically as in FIGS. 3 and 4) and other elements of transmitter 100 and receiver 200 are not shown or shown grouped into blocks numbered differently than in FIGS. 3 and 4.

Circuitry 109A (shown in FIGS. 3 and 5) of audio subsystem 108 of transmitter 100 generates time stamp data indicative of time stamps ("CTS" values) and numerator values ("N" values). Each "N" value is indicative of the numerator of a fraction by which the receiver is to multiply the frequency of an intermediate clock (derived from the pixel clock) to regenerate an audio clock. Packetization circuitry 138 (shown in FIG. 5) of transmitter 100 includes the time stamp data in at least some of the audio data packets that it generates. In typical embodiments, the audio data packets are transmitted to receiver 200 in data islands (as described above) by transmitter core 114 (shown in FIGS. 3 and 5). In some embodiments, the time stamp data are transmitted to receiver 200 in "audio clock regeneration" packets that contain both the "CTS" and "N" values. Transmitter core 114 also transmits the pixel clock to receiver 200.

In some cases, the input audio data "AUD" asserted to circuitry 109A are not embedded-clock audio data, and a separate audio reference clock (known as a "MCLK" or master clock) is asserted to circuitry 109A with the input audio data. Typically, the MCLK has frequency equal to Z*Fs, where Fs is the audio sample rate, and Z is equal to Y*128, wherein Y is a small integer such as 1, 2, or 3, or the MCLK has frequency equal to Z*Fs/X, where X is an integer. When an MCLK is asserted to circuitry 109A with the audio data, sample clock generation circuit 127 passes through the MCLK to clock divider 130. In response, clock divider 130 generates (and asserts to cycle time counter 131) an intermediate clock that is slower than the MCLK by the factor 1/N.

In the case that the audio data "AUD" are embedded-clock auxiliary data (having sample frequency Fs), sample clock generation circuit 127 generates a signal (denoted herein as a "sample clock" signal or "sample clock") that changes state in response to each occurrence of a data structure or code (referred to from now on as a "code," for simplicity) that occurs periodically (e.g., once per sample period) in the stream of audio data. Alternatively, the sample clock changes state in response to each "M"th occurrence of such code in the audio data stream, where M is an integer. Circuit 127 generates the sample clock without use of a phase-locked loop ("PLL"). In response to the sample clock, clock divider 130 generates (and asserts to cycle time counter 131) an intermediate clock that is slower than the sample clock by the factor 1/N. The value of "N" (asserted to divider 130 from register 129) need not be the same in the cases that audio data "AUD" are and are not embedded-clock auxiliary data.

Cycle time counter 131 asserts a sequence of time stamp values "CTS" in response to the pixel clock and the output of divider 130. Each time stamp value, CTS, is the number of pixel clock cycles in a defined audio period. In typical embodiments, each time stamp value, CTS, is the number of pixel clock cycles during each cycle of the intermediate clock (asserted by divider 130), so that each value of CTS satisfies CTS=(N*M*Fp)/(Y*Fs), where Fp is the pixel clock frequency, N and M are as described in the previous paragraph, and Y is an integer.

In preferred embodiments, circuit 127 generates the sample clock in response to synchronization codes embedded in an SPDIF audio data stream and each value of CTS (generated by cycle time counter 131) satisfies CTS=(N*Fp)/(Y*Fs), where N is the value asserted to divider 130 from register 129, and Y is an integer. In preferred embodiments, Y=128, and N satisfies (128*Fs)/1500 Hz≦N≦(128*Fs)/300 Hz.

Transmitter 100 determines the numerator value "N" (which is typically input thereto by the input data source) and stores data indicative of "N" in register 129 (shown in FIG. 5).

In an SPDIF audio data stream, the start of each sub-frame of the data is marked by a preamble sequence, as fully described in the specification of the well-known IEC 60958 standard. Each block of SPDIF data consists of a number of frames, each frame comprising two sub-frames. Each sub-frame is a 32-bit word comprising a 4-bit preamble followed by 28 bits (including a 20-bit audio data sample). The preamble can be any one of three 4-bit codes: a "B" value which marks a 32-bit word which is the first sub-frame of a block and contains a sample of channel 1 data (a "left" channel sample of stereo data); an "M" value which marks a 32-bit word which is not the first sub-frame of a block but which contains a sample of channel 1 data; or a "W" value which marks a 32-bit word containing a sample of channel 2 data (a "right" channel sample of stereo data).

In one preferred implementation, sample clock generation circuitry 127 is configured to generate a sample clock signal that changes state in response to each "B," "M," and "W" preamble of an SPDIF audio data stream. Such a sample clock signal can be used as a periodic audio timing reference whose frequency is the sample frequency, Fs, since the time elapsed for each sub-frame of the stream is one audio sample period. With such an implementation of circuitry 127, cycle time counter 131 is preferably configured to count the number of video clock cycles between consecutive edges of the intermediate clock signal output from divider 130, which is equivalent to repeatedly counting the number of video clock cycles between occurrence of an initial "B," "M," or "W" preamble and occurrence of the (2N)th "B," "M," or "W" preamble following the initial preamble. Thus, cycle time counter 131 effectively accomplishes a repeated evaluation of (N*Fp)/Fs, where Fp is the pixel clock frequency.

Alternatively, cycle time counter 131 is configured to generate each CTS value by counting the number of video clock cycles between consecutive edges of the intermediate clock signal output from divider 130 and dividing the count by Y, which is equivalent to repeatedly counting the number of video clock cycles between occurrence of an initial "B," "M," or "W" preamble and the occurrence of the (2N)th "B," "M," or "W" preamble following the initial preamble and dividing the count by Y. Thus, cycle time counter 131 effectively accomplishes a repeated evaluation of CTS=(N*Fp)/(Y*Fs)). Typically, Y=128.

An alternative to the FIG. 5 implementation of time stamp data generation circuitry 109A will be described with reference to FIG. 7. The FIG. 7 system is identical to that of FIG. 5 except that sample clock generation circuit 229 of FIG. 7 replaces circuit 127 and clock divider 130 of FIG. 5.

Figure 7:
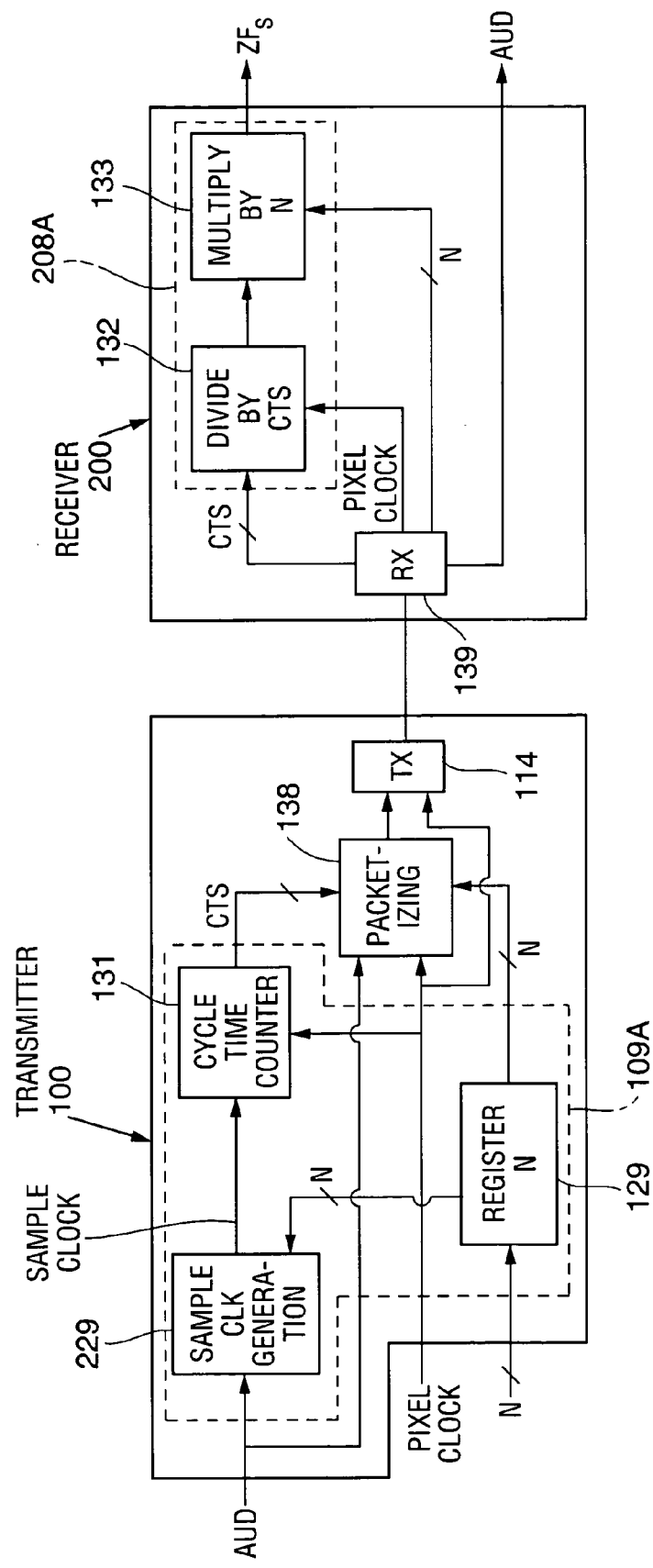
FIG. 7 is a block diagram of the auxiliary data clock transmission and regeneration circuitry employed in another embodiment of the inventive system that includes the transmitter of FIG. 3 and the receiver of FIG. 4.

Sample clock generation circuit 229 of FIG. 7 can be implemented to generate a sample clock signal that changes state in response to N occurrences of "B," "M," and/or "W" preambles of an SPDIF audio data stream (i.e., the sample clock signal output from circuit 229 changes state in response to any combination of N consecutive "B," "M," and/or "W" preambles in the input data stream AUD). In this case, cycle time counter 131 can be configured to count the number of video clock cycles between consecutive edges of the sample clock signal from circuit 229, or to count the number of video clock cycles between consecutive edges of the sample clock signal from circuit 229 and then to divide the count by Y.

Alternatively, sample clock generation circuit 229 of FIG. 7 can be identical to sample clock generation circuit 127, so that the sample clock signal generated by circuit 229 changes state in response to each "B." "M," and "W" preamble of an SPDIF audio data stream. In this case, cycle time counter 131 can be configured to generate each CTS value by repeatedly counting the number of video clock cycles between an initial edge of the sample clock signal from circuit 229 and the (N/Y)th edge of the sample clock signal after the initial edge. This is equivalent to counting the number of video clock cycles between occurrence of an initial "B," "M," or "W" preamble and the occurrence of the (N/Y)th "B," "M," or "W" preamble following the initial preamble. Typically, Y=128. If (N/Y) is not a whole number, counter 131 preferably accumulates the whole number portion of (NY)*(Fp/Fs). For example, if N/Y=5/2, counter 131 accumulates a value indicative of the number of video clock cycles between an initial edge of the sample clock signal and the second edge of the sample clock signal after the initial edge. Then, counter 131 counts the number of video clock cycles occurring before the next edge of the sample clock signal, and adds the appropriate fraction of the latter count (as determined from the fractional part of N/Y) to the accumulation to yield the CTS value.

The sample clock signal generated by circuit 127 (or circuit 229) can be jittery due to a number of reasons (such as but not limited to delay variations in determining the preamble of each sub-frame of SPDIF data, and synchronization variations). Thus, in preferred embodiments, circuit 127 includes circuitry (or circuitry is coupled between circuits 127 and 130) for removing jitter from the sample clock signal, and asserting the de-jittered sample clock signal (rather than the original, jitter-containing sample clock signal) to circuit 130, or such circuitry coupled between circuits 127 and 130. For example, in some embodiments, sample clock generation circuit 127 is configured to implement auto-phase adjustment to synchronize the sample clock and the pixel clock, when these clocks are coherent in the sense that both are derived from a common clock. This ensures that the CTS values do not vary over time.

If there is a constant fractional relationship between the sample clock (generated by circuit 127) and the pixel clock, and the two clocks are exactly synchronous, then the successive CTS values will quickly converge to a constant value. If the sample clock and pixel clock are asynchronous, or there is some amount of jitter between them, then the successive CTS values will typically alternate between different values.

Once CTS values are determined by cycle time counter 131 in accordance with the invention, it may be desirable to provide additional processing on them to minimize the variation among the CTS values. This can be done by averaging the CTS values (e.g., transmitting an averaged CTS value, $(CTS_1+CTS_2+\ldots+CTS_L)/L$, rather than CTSL itself) or building hysteresis into the CTS values.

There are a variety of auxiliary clock (e.g., audio clock) regeneration methods that can be implemented in a receiver that receives a pixel clock and time stamp data from the inventive transmitter. FIG. 5 is a block diagram of one embodiment of receiver 200 showing elements that are employed for audio clock regeneration. Receiving and decoding circuitry 139 of FIG. 5 recovers the pixel clock and time stamp data (indicative of the N and CTS values), as well as the transmitted audio data AUD and any transmitted video data. Audio clock regeneration circuitry 208A regenerates an audio clock from the time stamp data and the pixel clock (identified as "Pixel Clock" in FIG. 5) using clock divider 132 and clock multiplier 133. The audio clock can be a sample clock (originally generated by circuit 127 of transmitter 100), or a frequency-multiplied version of such a sample clock, or an MCLK (passed through to divider 130 by circuit 127). Each of the "MCLK" clock asserted at the output of receiver 2' of FIG. 2, the "MCLKOUT" clock asserted at the output of audio subsystem 208 of FIG. 4, and the "$ZF_s$" clock asserted by circuitry 208A of FIG. 5 can be a regenerated audio clock of any of the types mentioned in the previous sentence.

Clock divider 132 generates (and asserts to clock multiplier 133) an intermediate clock that is slower than the pixel clock by the factor 1/CTS. Clock multiplier 133 regenerates the sample clock (or MCLK) by generating an output clock whose frequency is that of the intermediate clock multiplied by the factor N.

Figure 6:
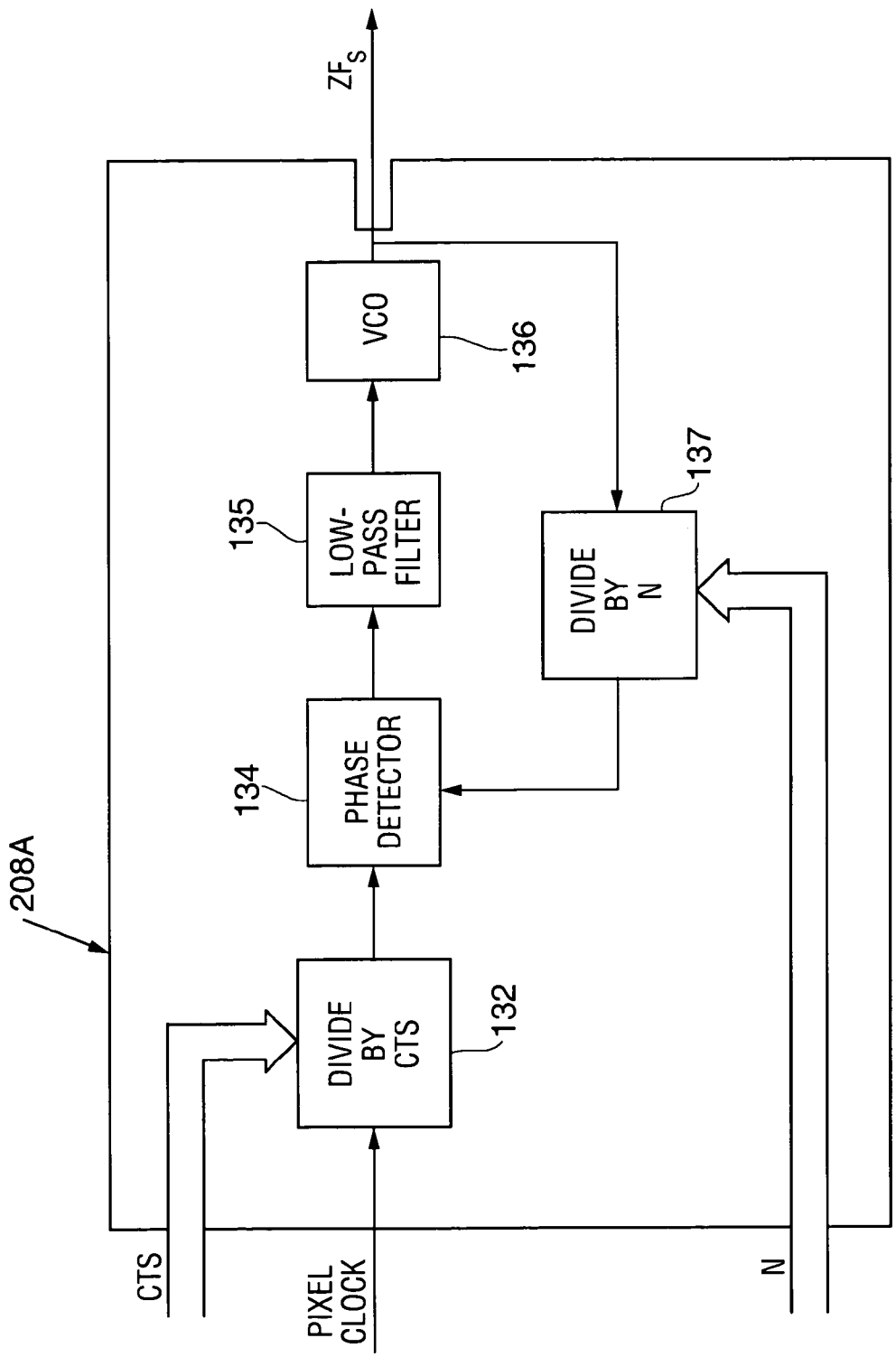
FIG. 6 is a block diagram of an embodiment of audio clock regeneration circuitry 208A of FIG. 5.

Clock multiplier 133 is typically implemented as a PLL as shown in FIG. 6, including a phase detector 134, low-pass filter 135, voltage-controlled oscillator 136, and frequency divider 137, connected as shown in FIG. 6. In preferred embodiments, the relationship between the frequencies of the regenerated sample clock (or MCLK) output from clock multiplier 133 and the pixel clock is $Z*Fs=(Fp*N)/CTS$, where Z is equal to Y*128, and Y is a small integer such as 1, 2, or 3.

To address the problem of jitter in CTS due to jitter in the sample clock (generated by circuit 127), some embodiments of the inventive transmitter implement an oversampling technique at the clock domain "boundary" (the boundary between the sample and pixel clocks) to automatically select delays which result in maximized setup and hold timing. For example, circuit 127 can be implemented to generate multiple phase-shifted versions of the sample clock (e.g., by oversampling the sample clock using multiple versions of the pixel clock, such as the pixel clock itself and the inverse of the pixel clock), and to select (for assertion to divider 130) one of the resulting streams of samples that results in the least CTS jitter. This can eliminate CTS jitter as long as the sample and pixel clocks are synchronized and reasonably stable.

In some embodiments, cycle time counter 131 is implemented to generate two sets of CTS values, using both the pixel clock (which can be denoted as "VCLK") and an inverted pixel clock (VCLK_bar) to count the clock edges of the intermediate clock output from divider 130, and to compare the two sets of CTS values to determine which shows less variation over time. The VCLK-based output can be selected (as the CTS values to be transmitted to the receiver) initially, with the option to switch to the VCLK_bar-based output if it shows less CTS value variation over time.

Other embodiments of cycle time counter 131 generate multiple sets of CTS values by employing several delay cells to generate multiphase versions of the pixel clock, and generating a set of CTS values using each different version of the pixel clock. Counter 131 (or other circuitry in the transmitter) than monitors the sets of CTS values for transitions and selects (for transmission to the receiver) the set having the fewest transitions. Circuitry for implementing this method would use little area on a transmitter chip, but would require hand design and layout for the timing critical sections.

The rate at which the "autoaligning" (the switching between different sets of CTS values) is done is preferably kept fairly low (e.g., on the time scale of seconds, or only at startup and when the audio or video frequency changes). This is because the audio clock and pixel clock timing is not expected to vary much in a particular design if coherent audio and video are being transmitted, unless there is some slow (e.g., temperature related) phase shift between the audio and pixel clocks. If relative timing of the pixel and audio clocks is changing fairly often (i.e. in the case of noncoherent audio and video), then the CTS value sent across the link should change fairly often. If the autoaligning were done continuously, then additional logic would be needed to ensure that the CTS values sent are accurate for the case where the audio and pixel clock are not quite synchronous (i.e. a slow drift between the two clock signals).

In some embodiments, the inventive transmitter implements digital filtering (low pass filtering) of the CTS values sent to the receiver. During audio clock regeneration using transmitted CTS values, the actual CTS values that are transmitted can vary from their average value (averaged over a short period) due to quantization error as well as pixel clock jitter (jitter in the clock employed for sampling the clock to be regenerated). This variation produces jitter on the regenerated clock.

In some embodiments, the transmitter digitally filters the CTS values to be transmitted to reduce regenerated audio clock jitter caused by quantization error and pixel clock jitter. The digital filter functions as a low-pass filter to suppress the higher frequency component of the time-stamp variation, and correspondingly suppress the higher frequency component of the regenerated clock jitter. The required word length for the filter output can be larger than the original time-stamped value CTS. In other words, the digitally filtered time-stamped value can have a fractional part in comparison to the original integer time-stamp CTS (i.e. 74.25 instead 74). If the longer time-stamp words are simply truncated to an integer, the filter will still function to attenuate the higher frequency jitter. However, the average of the truncated time-stamp values may not equal the average of the original sequence of time-stamp values, such that the regenerated clock frequency would not be accurate and the regenerated clock would have long-term drift relative to the original clock. In addition to long-term drift, truncation of the filtered time-stamp values will result in a truncation error that will increase the regenerated clock jitter.

Therefore it is important that the fractional part of the filtered CTS value be retained when regenerating the clock. A fractional-N type PLL can be employed in the receiver to preserve the longer words.

Typically the clock for a stream of audio data has a much lower frequency than the pixel clock for a stream of video. However, in most applications the audio clock needs to be more accurate than the pixel clock, to reduce jitter in the audio data. This is true since distortion in analog audio (that has been generated from digital audio data having jitter) is more easily discernible (to one experiencing the analog audio) than is the distortion in a displayed video program generated from digital video having the same amount of jitter.

In a class of embodiments, the invention is a method for generating time stamp data, including the steps of: without use of a phase-locked loop, generating a sample clock in response to a stream of embedded-clock auxiliary data indicative of samples of non-video auxiliary data that occur with a sample frequency, Fs; and generating the time stamp data in response to a video clock and the sample clock, such that the time stamp data are indicative of time stamps and each of the time stamps is a number of cycles of the video clock in a predetermined auxiliary data period. In typical embodiments, the embedded-clock auxiliary data are embedded-clock audio data, the predetermined auxiliary data period is a predetermined audio period, and the predetermined audio period is $P=X/(Y*Fs)$, where X and Y are integers.

It should be understood that while certain forms of the present invention are illustrated and described herein, the invention is defined by the claims and is not to be limited to the specific embodiments described and shown.

What is claimed is:

1. A communication system, including:
    a receiver;
    a transmitter; and
    a serial link between the transmitter and receiver, wherein the transmitter is configured to extract a sample clock from embedded-clock auxiliary data without use of a phase-locked loop, to generate time stamp data in response to a video clock and the sample clock, and to transmit auxiliary data, the time stamp data, and the video clock to the receiver over the link, and
    wherein the receiver is configured to generate an auxiliary data clock for the auxiliary data in response to the time stamp data and the video clock.

2. The system of claim 1, wherein the embedded-clock auxiliary data are embedded-clock audio data, and the transmitter is also configured to transmit video data to the receiver over the link.

3. The system of claim 2, wherein the auxiliary data that the transmitter is configured to transmit are audio samples derived from the embedded-clock auxiliary data.

4. The system of claim 3, wherein the transmitter is configured to generate the audio samples by stripping periodically-occurring preambles from the embedded-clock auxiliary data.

5. The system of claim 1, wherein the embedded-clock auxiliary data are embedded-clock audio data having a sample frequency, Fs, the time stamp data are indicative of time stamps, and each of the time stamps is a number of cycles of the video clock in a predetermined audio period.

6. The system of claim 5, wherein the predetermined audio period is $P=X/(Y*Fs)$, where X and Y are integers.

7. The system of claim 1, wherein the transmitter is configured to receive a stream of the embedded-clock auxiliary data, a code occurs periodically in the stream, and the sample clock changes state in response to each occurrence of the code in said stream.

8. The system of claim 1, wherein the transmitter is configured to receive a stream of the embedded-clock auxiliary data, a code occurs periodically in the stream, and the sample clock changes state in response to each Nth occurrence of the code in said stream, where N is an integer.

9. The system of claim 1, wherein the embedded-clock auxiliary data have a sample frequency, Fs, the sample clock signal has a frequency that is at least substantially equal to the sample frequency, Fs and the transmitter includes:
sample clock generation circuitry configured to generate the sample clock in response to the embedded-clock auxiliary data; and
time stamp data generation circuitry coupled to the sample clock generation circuitry and configured to use the sample clock signal as a periodic timing reference to generate the time stamp data.

10. The system of claim 9, wherein the time stamp data generation circuitry is configured to count the number of cycles of the video clock that occur during N cycles of the sample clock, thereby determining $N*(Fp/Fs)$, where Fp is the frequency of the video clock, and to generate time stamp data indicative of $(N*Fp)/(Y*Fs)$, where Y is an integer.

11. The system of claim 10, wherein $Y=128$.

12. The system of claim 9, wherein the time stamp data generation circuitry is configured to count the number of cycles of the video clock that occur during N/Y cycles of the sample clock, thereby determining $(N*Fp)/(Y*Fs)$, where Fp is the frequency of the video clock and N and Y are integers.

13. The system of claim 9, wherein Fp is the frequency of the video clock, N and Y are integers but N/Y is not a whole number, and the time stamp data generation circuitry is configured to count the number of cycles of the video clock that occur during W cycles of the sample clock, where W is the whole number portion of N/Y, thereby determining $W*(Fp/Fs)$, and then to count the number of cycles of the video clock that occur during the next cycle of the sample clock, thereby determining $Z=Fp/Fs$, and to generate time stamp data indicative of $(N/Y-W)*Z+W*(Fp/Fs)$.

14. The system of claim 1, wherein the embedded-clock auxiliary data have a sample frequency, Fs, the sample clock signal has a frequency that is at least substantially equal to a predetermined fraction of the sample frequency, Fs, and the transmitter includes:
sample clock generation circuitry configured to generate the sample clock in response to the embedded-clock auxiliary data; and
time stamp data generation circuitry coupled and configured to use the sample clock signal as a periodic timing reference to generate the time stamp data.

15. The system of claim 14, wherein the time stamp data generation circuitry is configured to count the number of cycles of the video clock that occur during N cycles of the sample clock, thereby determining $N*(Fp/Fs)$, where Fp is the frequency of the video clock, and to generate time stamp data indicative of $(N*Fp)/(Y*Fs)$, where Y is an integer.

16. The system of claim 15, wherein $Y=128$.

17. The system of claim 14, wherein the time stamp data generation circuitry is configured to count the number of cycles of the video clock that occur during N/Y cycles of the sample clock, thereby determining $(N*Fp)/(Y*Fs)$, where Fp is the frequency of the video clock and N and Y are integers.

18. The system of claim 14, wherein Fp is the frequency of the video clock, N and Y are integers but N/Y is not a whole number, and the time stamp data generation circuitry is configured to count the number of cycles of the video clock that occur during W cycles of the sample clock, where W is the whole number portion of N/Y, thereby determining $W*(Fp/Fs)$, and then to count the number of cycles of the video clock that occur during the next cycle of the sample clock, thereby determining $Z=Fp/Fs$, and to generate time stamp data indicative of $(N/Y-W)*Z+W*(Fp/Fs)$.

19. The system of claim 1, wherein the embedded-clock auxiliary data are SPDIF audio data, and the sample clock changes state in response to occurrences of synchronization codes embedded in the SPDIF audio data.

20. The system of claim 1, wherein the embedded-clock auxiliary data are SPDIF audio data having sample frequency, Fs, and the sample clock changes state in response to each occurrence of a B, M, or W preamble in the SPDIF audio data.

21. The system of claim 20, wherein the time stamp data generation circuitry is configured to count the number of cycles of the video clock that occur during N cycles of the sample clock, thereby determining $N*(Fp/Fs)$, where Fp is the frequency of the video clock, and to generate time stamp data indicative of $(N*Fp)/(Y*Fs)$, where Y is an integer.

22. The system of claim 20, wherein the time stamp data generation circuitry is configured to count the number of cycles of the video clock that occur during N/Y cycles of the sample clock, thereby determining $(N*Fp)/(Y*Fs)$, where Fp is the frequency of the video clock, where N and Y are integers.

23. The system of claim 20, wherein Fp is the frequency of the video clock, N and Y are integers but N/Y is not a whole number, and the time stamp data generation circuitry is configured to count the number of cycles of the video clock that occur during W cycles of the sample clock, where W is the whole number portion of N/Y, thereby determining $W*(Fp/Fs)$, and then to count the number of cycles of the video clock that occur during the next cycle of the sample clock, thereby determining $Z=Fp/Fs$, and to generate data indicative of $(N/Y-W)*Z+W*(Fp/Fs)$.

24. The system of claim 1, wherein the transmitter is configured to remove jitter from the sample clock, thereby generating a stabilized version of the sample clock, and to generate the time stamp data in response to the video clock and the stabilized version of the sample clock.

25. The system of claim 1, wherein the transmitter is configured to generate a first sequence of cycle time stamp values having a first average value in response to the video clock and the sample clock, and to process the cycle time stamp values to generate the time stamp data, wherein the time stamp data are indicative of a second sequence of cycle time stamp values having an average value at least substantially equal to the first average value, and wherein there is less variation among the cycle time stamps in the second sequence than among the cycle time stamps in the first sequence.

26. A transmitter configured to be coupled to a serial link having at least one video clock channel, said transmitter including:
at least one input coupled to receive embedded-clock auxiliary data;
at least two outputs configured to be coupled to the link, including a clock output configured to be coupled to the video clock channel; and
circuitry, coupled between the outputs and each said input, and configured to extract a sample clock from the embedded-clock auxiliary data without use of a phase-locked loop, to generate time stamp data in response to a video clock and the sample clock, to assert the video clock to the clock output, and to assert auxiliary data and the time stamp data to at least one of the outputs other than the clock output.

27. The transmitter of claim 26, wherein the embedded-clock auxiliary data are embedded-clock audio data.

28. The transmitter of claim 27, wherein the auxiliary data that the circuitry is configured to assert at said at least one of the outputs other than the clock output are audio samples derived from the embedded-clock auxiliary data.

29. The transmitter of claim 28, wherein the circuitry is configured to generate the audio samples by stripping periodically-occurring preambles from the embedded-clock auxiliary data.

30. The transmitter of claim 26, wherein the embedded-clock auxiliary data are embedded-clock audio data having a sample frequency, Fs, the time stamp data are indicative of time stamps, and each of the time stamps is a number of cycles of the video clock in a predetermined audio period.

31. The transmitter of claim 30, wherein the predetermined audio period is P=X/(Y*Fs), where X and Y are integers.

32. The transmitter of claim 26, wherein the circuitry is configured to receive a stream of the embedded-clock auxiliary data, a code occurs periodically in the stream, and the sample clock changes state in response to each occurrence of the code in said stream.

33. The transmitter of claim 26, wherein the circuitry is configured to receive a stream of the embedded-clock auxiliary data, a code occurs periodically in the stream, and the sample clock changes state in response to each Nth occurrence of the code in said stream, where N is an integer.

34. The transmitter of claim 26, wherein the embedded-clock auxiliary data have a sample frequency, Fs, the sample clock signal has a frequency that is at least substantially equal to the sample frequency, Fs and the circuitry includes:
sample clock generation circuitry configured to generate the sample clock in response to the embedded-clock auxiliary data; and
time stamp data generation circuitry coupled to the sample clock generation circuitry and configured to use the sample clock signal as a periodic timing reference to generate the time stamp data.

35. The transmitter of claim 34, wherein the time stamp data generation circuitry is configured to count the number of cycles of the video clock that occur during N cycles of the sample clock, thereby determining N*(Fp/Fs), where Fp is the frequency of the video clock, and to generate time stamp data indicative of (N*Fp)/(Y*Fs), where Y is an integer.

36. The transmitter of claim 34, wherein the time stamp data generation circuitry is configured to count the number of cycles of the video clock that occur during N/Y cycles of the sample clock, thereby determining (N*Fp)/(Y*Fs), where Fp is the frequency of the video clock and N and Y are integers.

37. The transmitter of claim 34, wherein Fp is the frequency of the video clock, N and Y are integers but N/Y is not a whole number, and the time stamp data generation circuitry is configured to count the number of cycles of the video clock that occur during W cycles of the sample clock, where W is the whole number portion of N/Y, thereby determining W*(Fp/Fs), and then to count the number of cycles of the video clock that occur during the next cycle of the sample clock, thereby determining Z=Fp/Fs, and to generate time stamp data indicative of (N/Y−W)*Z+W*(Fp/Fs).

38. The transmitter of claim 26, wherein the embedded-clock auxiliary data have a sample frequency, Fs, the sample clock signal has a frequency that is at least substantially equal to a predetermined fraction of the sample frequency, Fs, and the transmitter includes:
sample clock generation circuitry configured to generate the sample clock in response to the embedded-clock auxiliary data; and
time stamp data generation circuitry coupled to the sample clock generation circuitry and configured to use the sample clock signal as a periodic timing reference to generate the time stamp data.

39. The transmitter of claim 38, wherein the time stamp data generation circuitry is configured to count the number of cycles of the video clock that occur during N cycles of the sample clock, thereby determining N*(Fp/Fs), where Fp is the frequency of the video clock, and to generate time stamp data indicative of (N*Fp)/(Y*Fs), where Y is an integer.

40. The transmitter of claim 38, wherein the time stamp data generation circuitry is configured to count the number of cycles of the video clock that occur during N/Y cycles of the sample clock, thereby determining (N*Fp)/(Y*Fs), where Fp is the frequency of the video clock and N and Y are integers.

41. The transmitter of claim 38, wherein Fp is the frequency of the video clock, N and Y are integers but N/Y is not a whole number, and the time stamp data generation circuitry is configured to count the number of cycles of the video clock that occur during W cycles of the sample clock, where W is the whole number portion of N/Y, thereby determining W*(Fp/Fs), and then to count the number of cycles of the video clock that occur during the next cycle of the sample clock, thereby determining Z=Fp/Fs, and to generate time stamp data indicative of (N/Y−W)*Z+W*(Fp/Fs).

42. The transmitter of claim 26, wherein the embedded-clock auxiliary data are SPDIF audio data, and the sample clock changes state in response to occurrences of synchronization codes embedded in the SPDIF audio data.

43. The transmitter of claim 26, wherein the embedded-clock auxiliary data are SPDIF audio data having sample frequency, Fs, and the sample clock changes state in response to each occurrence of a B, M, or W preamble in the SPDIF audio data.

44. The transmitter of claim 43, wherein the time stamp data generation circuitry is configured to count the number of cycles of the video clock that occur during N cycles of the sample clock, thereby determining N*(Fp/Fs), where Fp is the frequency of the video clock, and to generate time stamp data indicative of (N*Fp)/(Y*Fs), where Y is an integer.

45. The transmitter of claim 43, wherein the time stamp data generation circuitry is configured to count the number of cycles of the video clock that occur during N/Y cycles of the sample clock, thereby determining (N*Fp)/(Y*Fs), where Fp is the frequency of the video clock, where N and Y are integers.

46. The transmitter of claim 43, wherein Fp is the frequency of the video clock, N and Y are integers but N/Y is not a whole number, and the time stamp data generation circuitry is configured to count the number of cycles of the video clock that occur during W cycles of the sample clock, where W is the whole number portion of N/Y, thereby determining W*(Fp/Fs), and then to count the number of cycles of the video clock that occur during the next cycle of the sample clock, thereby determining Z=Fp/Fs, and to generate data indicative of (N/Y−W)*Z+W*(Fp/Fs).

47. The transmitter of claim 26, wherein the circuitry is configured to remove jitter from the sample clock, thereby generating a stabilized version of the sample clock, and to generate the time stamp data in response to the video clock and the stabilized version of the sample clock.

48. The transmitter of claim 26, wherein the circuitry is configured to generate a first sequence of cycle time stamp values having a first average value in response to the video clock and the sample clock, and to process the cycle time stamp values to generate the time stamp data, wherein the time stamp data are indicative of a second sequence of cycle time stamp values having an average value at least substantially equal to the first average value, and wherein there is less variation among the cycle time stamps in the second sequence than among the cycle time stamps in the first sequence.

49. A time stamp generation circuit for use in a transmitter, said circuit including:

sample clock generation circuitry coupled and configured to extract a sample clock from a stream of embedded-clock auxiliary data without use of a phase-locked loop; and time stamp data generation circuitry coupled to the sample clock generation circuitry and configured to generate time stamp data in response to a video clock and the sample clock, wherein the embedded-clock auxiliary data are indicative of samples of non-video auxiliary data that occur with a sample frequency, Fs, the time stamp data are indicative of time stamps, and each of the time stamps is a number of cycles of the video clock in a predetermined audio period.

50. The circuit of claim 49, wherein the predetermined audio period is P=X/(Y*Fs), where X and Y are integers.

51. The circuit of claim 49, wherein a code occurs periodically in the stream of embedded-clock auxiliary data, and the sample clock changes state in response to each occurrence of the code in said stream.

52. The circuit of claim 49, wherein a code occurs periodically in the stream of embedded-clock auxiliary data, and the sample clock changes state in response to each Nth occurrence of the code in said stream, where N is an integer.

53. The circuit of claim 49, wherein the embedded-clock auxiliary data are SPDIF audio data, and the sample clock changes state in response to occurrences of synchronization codes embedded in the SPDIF audio data.

54. The circuit of claim 49, wherein the embedded-clock auxiliary data are SPDIF audio data, and the sample clock changes state in response to each occurrence of a B, M, or W preamble in the SPDIF audio data.

55. A method for generating time stamp data, including the steps of:

(a) without use of a phase-locked loop, generating a sample clock in response to a stream of embedded-clock auxiliary data indicative of samples of non-video auxiliary data that occur with a sample frequency, Fs; and (b) generating the time stamp data in response to a video clock and the sample clock, such that the time stamp data are indicative of time stamps and each of the time stamps is a number of cycles of the video clock in a predetermined auxiliary data period.

56. The method of claim 55, wherein the embedded-clock auxiliary data are embedded-clock audio data, the predetermined auxiliary data period is a predetermined audio period, and the predetermined audio period is P=X/(Y*Fs), where X and Y are integers.

57. The method of claim 55, wherein a code occurs periodically in the stream of embedded-clock auxiliary data, and step (a) includes the step of generating the sample clock such that said sample clock changes state in response to each occurrence of the code in said stream.

58. The method of claim 55, wherein a code occurs periodically in the stream of embedded-clock auxiliary data, and step (a) includes the step of generating the sample clock such that said sample clock changes state in response to each Nth occurrence of the code in said stream, where N is an integer.

59. The method of claim 55, wherein the embedded-clock auxiliary data are SPDIF audio data, and step (a) includes the step of generating the sample clock such that said sample clock changes state in response to occurrences of synchronization codes embedded in the SPDIF audio data.

60. The method of claim 55, wherein the embedded-clock auxiliary data are SPDIF audio data, and step (a) includes the step of generating the sample clock such that said sample clock changes state in response to each occurrence of a B, M, or W preamble in the SPDIF audio data.

61. The method of claim 55, wherein step (b) includes the steps of:

counting the number of cycles of the video clock that occur during N cycles of the sample clock, thereby determining N*(Fp/Fs), where Fp is the frequency of the video clock; and generating the time stamp data such that said time stamp data are indicative of (N*Fp)/(Y*Fs), where Y is an integer.

62. The method of claim 55, wherein step (b) includes the step of:

counting the number of cycles of the video clock that occur during N/Y cycles of the sample clock, thereby determining (N*Fp)/(Y*Fs), where Fp is the frequency of the video clock, where N and Y are integers.

63. The method of claim 55, wherein Fp is the frequency of the video clock, N and Y are integers but N/Y is not a whole number, and step (b) includes the steps of:

counting the number of cycles of the video clock that occur during W cycles of the sample clock, where W is the whole number portion of N/Y, thereby determining W*(Fp/Fs), and then counting the number of cycles of the video clock that occur during the next cycle of the sample clock, thereby determining Z=Fp/Fs; and generating the time stamp data such that said time stamp data are indicative of (N/Y−W)*Z+W*(Fp/Fs).

* * * * *